(12) United States Patent
Mochizuki et al.

(10) Patent No.: US 10,518,277 B2
(45) Date of Patent: Dec. 31, 2019

(54) GREASE APPLICATION DEVICE AND GREASE APPLICATION METHOD

(71) Applicant: HONDA MOTOR CO., LTD., Tokyo (JP)

(72) Inventors: Keiji Mochizuki, Tokyo (JP); Azuma Miyazaki, Tokyo (JP); Shinnosuke Nozue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 15/560,205

(22) PCT Filed: Mar. 22, 2016

(86) PCT No.: PCT/JP2016/058945
§ 371 (c)(1),
(2) Date: Sep. 21, 2017

(87) PCT Pub. No.: WO2016/158557
PCT Pub. Date: Oct. 6, 2016

(65) Prior Publication Data
US 2018/0071756 A1 Mar. 15, 2018

(30) Foreign Application Priority Data
Mar. 27, 2015 (JP) ................................. 2015-065432

(51) Int. Cl.
*B05B 1/34* (2006.01)
*F16N 29/04* (2006.01)
(Continued)

(52) U.S. Cl.
CPC .......... *B05B 1/3489* (2013.01); *B05B 9/0403* (2013.01); *B05B 12/02* (2013.01);
(Continued)

(58) Field of Classification Search
CPC ... F16N 3/12; F16N 11/08; F16N 5/02; B05B 7/066
(Continued)

(56) References Cited

U.S. PATENT DOCUMENTS 1,961,477 A * 6/1934 Davis ........................ F16N 7/30
184/55.1
3,717,222 A * 2/1973 Moline ................... B05C 17/01
184/5.1
(Continued)

FOREIGN PATENT DOCUMENTS

CN 202667069 U 1/2013
CN 204020195 U 12/2014
(Continued)

OTHER PUBLICATIONS

International Search Report, dated Jun. 21, 2016 (Jun. 21, 2016), 2 pages.
(Continued)

*Primary Examiner* — Henry Y Liu
(74) *Attorney, Agent, or Firm* — Rankin, Hill & Clark LLP

(57) ABSTRACT

This grease application device includes: a nozzle body that has a first end portion insertable into an inner spline portion, the inner spline portion being formed at an end portion of a workpiece; a nozzle that is formed on the first end portion of the nozzle body and discharges grease into a groove of the inner spline portion; a nozzle body shift portion that is connected to a second end portion of the nozzle body and that moves the nozzle body in a longitudinal direction, the second end portion being on an opposite side to the first end portion; a grease retention portion that retains the grease discharged from the nozzle; a grease pressure-feed portion that pressure-feeds the grease retained in the grease retention portion to the nozzle; and an operation portion that links an (Continued)

operation of causing the nozzle body shift portion to move the nozzle body from the first end portion toward the second end portion with an operation of causing the grease pressure-feed portion to discharge the grease from the nozzle.

11 Claims, 18 Drawing Sheets

(51) Int. Cl.
- *B05C 11/10* (2006.01)
- *F16N 3/12* (2006.01)
- *B05C 7/08* (2006.01)
- *B05B 9/04* (2006.01)
- *B05B 12/02* (2006.01)

(52) U.S. Cl.
CPC .............. *B05C 7/08* (2013.01); *B05C 11/10* (2013.01); *F16N 3/12* (2013.01); *F16N 29/04* (2013.01)

(58) Field of Classification Search
USPC ...................................................... 184/105.2
See application file for complete search history.

(56) References Cited

U.S. PATENT DOCUMENTS

| | | | | |
|---|---|---|---|---|
| 3,801,021 A * | 4/1974 | Jakob | ............... | B01D 3/06 239/571 |
| 3,938,623 A * | 2/1976 | Winston | ............... | F16N 3/12 184/38.1 |
| 3,980,237 A * | 9/1976 | Parrish, Jr. | ............... | F02M 61/10 239/533.3 |
| 4,946,077 A * | 8/1990 | Olsen | ............... | F16N 3/12 184/105.2 |
| 5,044,471 A * | 9/1991 | Machek | ............... | F16N 3/12 184/105.2 |
| 5,067,591 A * | 11/1991 | Fehlig | ............... | F16N 5/02 141/21 |
| 5,707,010 A * | 1/1998 | Manfre | ............... | B05B 7/066 239/296 |
| 5,772,573 A * | 6/1998 | Hao | ............... | B04B 1/2016 184/11.2 |
| 6,068,164 A * | 5/2000 | Totaro | ............... | F16N 3/12 222/389 |
| 6,276,492 B1 * | 8/2001 | Carroll | ............... | F16N 3/12 184/105.2 |
| 6,311,876 B1 * | 11/2001 | Liu | ............... | B65D 83/20 222/394 |
| 6,695,590 B1 * | 2/2004 | Rydin | ............... | F04B 13/00 184/105.2 |
| 6,827,299 B2 * | 12/2004 | Scotchmur | ............... | B05B 7/066 239/290 |
| 7,337,927 B2 * | 3/2008 | Linkletter | ............... | F16N 3/12 184/105.2 |
| 7,484,642 B2 * | 2/2009 | Bonney | ............... | B05B 11/0048 222/256 |
| 7,527,176 B2 * | 5/2009 | Weems | ............... | F16N 3/12 184/105.2 |
| 9,375,762 B2 * | 6/2016 | Loussaert | ............... | B08B 3/026 |
| 2004/0112680 A1 * | 6/2004 | Chou | ............... | F16N 11/10 184/105.2 |
| 2008/0017449 A1 * | 1/2008 | Liao | ............... | F16N 11/08 184/5.1 |
| 2010/0116850 A1 * | 5/2010 | Weems | ............... | F16N 3/12 222/256 |
| 2014/0261807 A1 * | 9/2014 | Cooley | ............... | E02F 9/2275 137/614.01 |
| 2015/0330564 A1 * | 11/2015 | Mueller | ............... | F16N 25/00 184/7.4 |

FOREIGN PATENT DOCUMENTS

| | | |
|---|---|---|
| GB | 2 273 745 | 6/1994 |
| JP | 61-52797 | 4/1986 |
| JP | 2-53164 | 4/1990 |
| JP | 03-139769 A | 6/1991 |
| JP | 6-193793 | 7/1994 |
| JP | 06-241391 | 8/1994 |
| JP | 2009-189897 | 8/2009 |

OTHER PUBLICATIONS

Chinese Office Action with partial English translation, dated Oct. 31, 2018, 7 pages.

* cited by examiner

GREASE APPLICATION DEVICE AND GREASE APPLICATION METHOD

TECHNICAL FIELD

The present invention relates to a grease application device and a grease application method.

The present application claims priority based on Japanese Patent Application No. 2015-065432 filed on Mar. 27, 2015, the contents of which are incorporated herein by reference.

BACKGROUND ART

Conventionally, for engagement of mechanical parts, a variety of forms are adopted, for example, a fastening method by use of bolt(s), a physical joining method such as caulking, a welding method, and a chemical joining method such as an adhering method by an adhesive. For engagement of mechanical parts, there are also forms by which the parts are not completely joined.

For example, there are also mechanical parts that are spline engaged, such as a universal joint whose rotation direction is variable. For example, for engagement of a shaft, there are cases where involute spline (hereinafter, referred to as spline) is used for engagement between the shaft and the boss portion because the shaft is engaged with some degrees of freedom.

Splines allow a shaft or a shaft-like member to be engaged so as to be slidable in the axis direction and so that an axial torque is transmittable by mutual teeth fitting. A feature of splines is that they are highly strong and easy to be machined. For example, a shaft side of a spline can be fabricated by hobbing machining or by rolling. For example, the hole side of spline can be fabricated by broaching machining. For example, splines are heavily used for parts of a drive system of moving vehicles, such as a transmission.

Onto the spline formed on a shaft end of the rotation shaft that transmits power, grease is applied as a lubricant.

For example, in the grease application device described in Patent Document 1, a serrated small-diameter portion (hereinafter, referred to as serrated portion) of the shaft end portion is inserted into a blind hole that is formed by the nozzle block and the cylindrical body. Furthermore, through an annular recess portion that is formed between the nozzle block and the cylindrical body when the cylindrical body is inserted, grease is pressure-fed from a plurality of grease distribution holes that are opened in the cylindrical body. Grease is filled in the gap of the blind hole of the cylindrical body into which the serration portion is inserted. The surplus grease is discharged from a grease drain hole that is opened in the cylindrical body.

In the ultrasonic grease injection device described in Patent Document 2, the discharge portion has a circular pillar-like shape in an interior of which a plurality of discharge holes are radially formed. On an outer circumference of this discharge portion, there are formed recesses and protrusions that are extended in the shaft direction for positioning the discharge holes to a grease injection area in a roller clutch. Furthermore, this device includes an ultrasonic vibration generation portion that generates an ultrasonic vibration and transmits it to the discharge portion.

In this device, with an ultrasonic vibration being applied to the discharge portion, the flow resistance of grease significantly decreases.

In the grease application device described in Patent Document 3, into the center hole formed in a workpiece, there is inserted a first application nozzle whose outer circumferential surface has a first grease discharge hole for discharging grease. In this grease application device, there is formed a first grease pool portion that is located gravitationally below the first grease discharge hole of the first application nozzle. In this device, even if application work of grease is repeated a multitude of times and the grease remained around the grease discharge hole trickles down under its own weight, then the grease moves to the grease pool portion, and the grease having entered the grease pool portion will not spread along the outer circumferential surface of the application nozzle.

RELATED ART DOCUMENT

Patent Document

Patent Document 1: Japanese Unexamined Utility Model Application, First Publication No. S61-52797
Patent Document 2: Japanese Unexamined Patent Application, First Publication No. H06-241391
Patent Document 3: Japanese Unexamined Patent Application, First Publication No. 2009-189897

SUMMARY

Problems to be Solved by the Invention

However, the conventional grease application devices as described above have problems as follows:

In the device described in Patent Document 1, grease is applied to the whole region of the serration portion of the shaft end portion. In general, grease is likely to be retained in the end portion of the serration portion. When the retained grease is hardened, friction increases, which prohibits smooth rotation of the shaft. Therefore, it is required to removed the grease applied to the end portion of the serration portion. This leads to a possible increase in the number of steps.

In the device described in Patent Document 1, grease is pressure-fed by the pressure feed pump to be supplied into the gap. Therefore, there is a possibility that grease will leak out to the shaft end surface or the base end side of the shaft. In the case where grease leaks out, it is required to be removed. This leads to an additional step.

When the device of Patent Document 1 is used to insert a shaft end portion, to which grease is applied, into a hole portion side of the corresponding mating piece, the applied grease may be squeezed out of the serration portion and the hole portion. Therefore, there is a possibility that effective lubrication is not expected.

In the device described in Patent Document 2, with an ultrasonic vibration being applied to the discharge portion, the flow resistance of grease significantly decreases.

However, in the device described in Patent Document 2, grease becomes likely to flow. Therefore, it is difficult to control the state of application to the application target area. For example, it is difficult to apply grease so that the grease will not be squeezed widely out of the discharge hole or so as to be in a specified shape. Furthermore, to supply a predetermined amount of grease in a short period of time, an ultrasonic vibration mechanism is essential, which is a cause of an increase in costs.

In the device described in Patent Document 3, even if the application nozzle is inserted into the hole of the application target part, the grease in the grease pool portion will not be attached to the application target part. Therefore, it is possible to prevent the grease from being attached to somewhere other than the application area.

The device described in Patent Document 3 tries to move the surplus grease to the grease pool portion, to thereby prevent a trouble caused by application of excessive amount of grease. However, the device described in Patent Document 3 has a problem of not having a function of applying a predetermined amount of grease to a predetermined location of a workpiece.

The present invention has been achieved in view of the aforementioned problems, and has an object to provide a grease application device and a grease application method that are capable of easily and securely applying a given amount of grease into a groove of an inner spline portion.

Means for Solving the Problem

To solve the aforementioned problems, according to a grease application device of a first aspect of the present invention is a grease application device that includes: a nozzle body that has a first end portion insertable into an inner spline portion, the inner spline portion being formed at an end portion of a workpiece; a nozzle that is formed on the first end portion of the nozzle body and discharges grease into a groove of the inner spline portion; a nozzle body shift portion that is connected to a second end portion of the nozzle body and that moves the nozzle body in a longitudinal direction, the second end portion being on an opposite side to the first end portion; a grease retention portion that retains the grease discharged from the nozzle; a grease pressure-feed portion that pressure-feeds the grease retained in the grease retention portion to the nozzle; and an operation portion that links an operation of causing the nozzle body shift portion to move the nozzle body from the first end portion toward the second end portion with an operation of causing the grease pressure-feed portion to discharge the grease from the nozzle.

In this case, the nozzle body is inserted into the workpiece inner spline portion, and the operation portion is operated. Thereby, the grease pressure-feed portion and the nozzle body shift portion operate in a linked manner. The nozzle pressure-feed portion causes the grease, which is retained in the grease retention portion, to be discharged from the nozzle. By the nozzle body shift portion that operates in a linked manner with this discharge operation, the nozzle body is moved from the first end portion toward the second end portion in the longitudinal direction.

Into the groove of the inner spline portion in which the nozzle is arranged, a given amount of grease that is retained in the grease retention portion is applied in a range corresponding to a distance of movement of the nozzle body from the position of the nozzle in the insertion position of the nozzle body.

Therefore, with a simple operation of inserting the nozzle body into the inner spline portion and operating the operation portion, a given amount of grease is applied to a specific location that is determined by the arrangement of the nozzle.

According to a grease application device of a second aspect of the present invention, in the grease application device of the aforementioned first aspect, an outline of the first end portion of the nozzle body may be a spline shape that is fitted into the inner spline portion; and in an interior of the nozzle body, a grease flow passage may be formed that is connected to the grease retention portion and the nozzle, and that allows the grease, which is pressure-fed from the grease retention portion, to flow into the nozzle.

In this case, the outline of the nozzle body has a spline shape that is fitted into the inner spline portion. Therefore, the nozzle is precisely positioned in the circumferential direction with respect to the inner spline portion.

The grease that is pressure-fed from the grease retention portion to the nozzle flows into the grease flow passage that is provided in the interior of the nozzle body. Therefore, it is not required to insert a pipe for supplying grease into a workpiece separately from the nozzle body. So long as a workpiece allows a nozzle body to be inserted thereinto, it is possible to perform grease application to the workpiece even if the insertion hole is narrow.

Because it is not required to insert a pipe for supplying grease into a workpiece separate from the nozzle body, the device is made compact, and furthermore, workability at the time of insertion of the nozzle body improves as well.

According to a grease application device of a third aspect of the present invention, in the grease application device of the aforementioned second aspect, in a middle portion in the longitudinal direction, the nozzle body may include a guide rib that is attached so as to be movable in the longitudinal direction with respect to a hole portion formed in the end portion of the workpiece or to an inner circumferential surface of a collar insertable into the hole portion.

In this case, the nozzle body has a guide rib. Therefore, with the guide rib itself or the collar attached to the guide rib being inserted into the hole portion that is formed in the end portion of the workpiece, it is possible to move the nozzle body in the longitudinal direction. Therefore, it is possible to move the nozzle body along the hole portion of the workpiece. As a result, when the nozzle body is moved, it is possible to suppress a runout of the nozzle body. Therefore, the movement of the nozzle body is made stable, to thereby make it possible to do smooth grease application work.

With preparation of a variety of collars with various shapes and sizes according to the shapes and sizes of the hole portions of the workpieces, it is possible to stabilize the movement of the nozzle body for a variety of workpieces.

According to a grease application device of a fourth aspect of the present invention, in the grease application device of the aforementioned first aspect, on an outer circumferential portion of the first end portion of the nozzle body, an inclined surface may be formed that is inclined from an outer circumferential side toward a center in a direction from the second end portion toward the first end portion; and in the direction from the second end portion toward the first end portion, the nozzle may be inclined from an interior of the nozzle body toward an outer circumferential side and may be opened in the inclined surface.

In this case, the nozzle is arranged in an inclined manner. Therefore, when the grease is pressure-fed, the grease proceeds from the second end portion to the first end portion. Furthermore, the grease is discharged to the front end side of the first end portion from the nozzle that is inclined from the interior of the nozzle body toward the outer circumferential side. At the same time, the nozzle body is moved in the direction from the first end portion toward the second end portion. The discharged grease is pushed out from the radially inner side in the groove of the inner spline portion, and, at the same time, is linearly drawn, with the movement of the nozzle body, in the extension direction of the groove.

In the opening of the nozzle, there is formed an inclined surface that inclines in the direction opposite to the direction of inclination of the nozzle. Therefore, with a space in the discharge direction of the grease between the groove bottom of the inner spline portion and the inclined surface being expanded, the pressure of the grease is lessened. The grease is smoothly discharged. As a result, the grease is inhibited from splattering at the time of discharge due to discharge pressure or from splattering because the grease has nowhere to go in the discharge target area.

The grease immediately after discharge is guided in the vicinity of the opening along the inclined surface. Therefore, immediately after discharge, the grease will not freely move to expand. The discharged grease is successively filled in the region sandwiched between the inclined surface and the groove inner surface.

When the nozzle body is pulled out from the inner spline portion at the completion of discharge, spacing off between the end portion of the nozzle body and the applied grease is performed smoothly because the inclined surface is provided. Therefore, an application shape of the applied grease is not deformed, and also the easiness to cut of the grease with respect to the end portion of the nozzle body improves.

Thus, at the time of applying the grease and at the time of pulling out the nozzle body, splattering and deformation of the grease will not be produced. This eliminates the necessity of wiping off the grease on the inner spline portion or the nozzle. Therefore, a swift grease application is made available.

According to a grease application device of a fifth aspect of the present invention, in the grease application device of the aforementioned first aspect, in the first end portion of the nozzle body, there may be formed: a circular pillar portion that is inserted inner than an innermost circumferential portion of the inner spline portion; a chamfer portion that is formed in an outer circumferential portion of a front end of the circular pillar portion; and a plurality of groove portions with a V-shaped cross-section that are formed across the chamfer portion so as to be inclined in a first rotation direction about a central axis line of the nozzle body from a center side of the first end portion toward an outer circumference side when seen from an axis direction of the first end portion; in an interior of the nozzle body, a grease flow passage may be formed that is connected to the grease retention portion and the nozzles, and that allows the grease, which is pressure-fed from the grease retention portion, to flow into the nozzles; the nozzles may extend in oblique directions that are inclined in the first rotation direction from an interior of the first end portion toward an outer circumferential portion and also toward a front end of the first end portion, and additionally may open in groove surfaces of the groove portions, the groove surfaces being inclined in a second rotation direction opposite to the first rotation direction; and when moving the nozzle body from the first end portion toward the second end portion in the longitudinal direction, the nozzle body shift portion may rotate the nozzle body in the second rotation direction.

In this case, on the first end portion of the nozzle body, there is formed a circular pillar portion that is inserted inner than the innermost circumferential portion of the inner spline portion. Therefore, it is possible to insert the nozzle body into the inner spline portion without being fitted into the grooves of the inner spline portion. Because the operator is allowed to insert the nozzle body without making a circumferential positional adjustment of the nozzle body of the grease application device with respect to the inner spline portion, an insertion operation of the nozzle body is made easy. Similarly, an automated insertion of the nozzle body into the inner spline portion by use of a robot or the like is made easy as well.

In the nozzle body that has been inserted into an interior of the inner spline portion, the grease pressure-feed portion and the nozzle body shift portion operate in a linked manner through the operation on the operation portion. The nozzle pressure-feed portion causes the grease, which is retained in the grease retention portion, to be discharged from the nozzle. In the direction toward obliquely ahead of the nozzle body and also toward the inner spline portion, the grease is discharged, along the pathways of the nozzles, from the openings of the groove surfaces, which are inclined in the second rotation direction, of the groove portions on the first end portion of the nozzle body.

By the nozzle body shift portion that operates in a linked manner with this discharge operation, the nozzle body is moved from the first end portion toward the second end portion in the longitudinal direction, and is also rotated in the second rotation direction.

With these movement and rotation of the nozzle body, the grease is applied along the spiral trail that traverses diagonally on the grooves of the inner spline portion. At least a part of the grease that traverses diagonally on the grooves of the inner spline portion is pushed into the grooves of the inner spline portion in accordance with the discharge pressure.

According to a grease application device of a sixth aspect of the present invention, in the grease application device of the aforementioned first aspect, the grease retention portion may include a measurement chamber that retains a given amount of the grease; and through an operation on the operation portion, the grease pressure-feed portion may discharge the grease from the nozzle within a range of the given amount that is retained in the measurement chamber.

In this case, through the operation on the operation portion, it is possible to discharge the grease in a range of a given amount in the measurement chamber. Therefore, it is possible to precisely apply a given amount of grease only through an operation on the operation portion.

In the case where a given relationship is provided between the operation amount of the operation portion and the discharge amount, it is possible to apply an optional amount not more than a given amount according to an amount of operation on the operation portion. For example, if an operation lever is used as the operation portion, then an amount of operation is an amount of movement of the operation lever. This makes easy an adjustment of an application amount.

According to a grease application device of a seventh aspect of the present invention, in the grease application device of the aforementioned first aspect, the nozzle body shift portion, the grease retention portion, the grease pressure-feed portion, and the operation portion may be provided in a holder body that is movably held by an operator; and the nozzle body may be moved in the longitudinal direction by the nozzle body shift portion that is fixed to the holder body.

In this case, while holding the holder body, the operator is allowed to insert the nozzle body into the inner spline portion at the end portion of the workpiece, and applying grease to the inner spline portion. At that time, after appropriately moving the position of the holder body and then inserting the nozzle body to the position where a grease application is performed, the operator holds the holder body in place. When, in this state, the operator operates on the operation portion, then the discharge of grease from the nozzle and the movement of the nozzle body are performed in a linked manner while the operator is holding the holder body in place. Only through the operation on the operation portion, the operator is allowed to easily and securely apply grease.

Thus, the holder body of the grease application device is movably held by the operator. Therefore, even for workpiece inner spline portions that are formed in various positions, it is possible for the operator to easily move the nozzle body to the inner spline portion and to perform a grease application.

According to a grease application device of an eighth aspect of the present invention, the grease application device of the aforementioned seventh aspect may include: a grease supply tube with flexibility that is connected to the grease retention portion in order to supply grease to the grease retention portion; and a hanger member on which the grease supply tube is hung.

In this case, because a grease supply tube with flexibility is connected to the grease retention portion, the degree of freedom in positional relationship between the grease supply source and the holder body improves. Because it is possible to move the holder body in the range of length of the grease supply tube to do grease application work, workability of grease application work improves.

Furthermore, because the grease supply tube is hung on the hanger member, it is possible to move the grease supply tube without dragging the grease supply tube on the floor or the like. Therefore, also in that the movement of the holder body is made easy, workability of grease application improves.

Especially in the case where a single workpiece has a plurality of grease application areas, workability improves.

According to a grease application device of a ninth aspect of the present invention, the grease application device of the aforementioned seventh aspect may include: a mount on which the holder body and the nozzle body are mounted; and a mount-time shutoff valve that is arranged on the mount and that, in a linked manner with a mount state and a mount-release state of the holder body and the nozzle body on the mount, shuts off a flow passage of the grease supplied to the grease retention portion in the mount state and opens the flow passage of the grease supplied to the grease retention portion in the mount-release state.

In this case, when the holder body and the nozzle body are mounted on the mount, the mount-time shutoff valve is closed in a linked manner with the mounting operation. The flow passage of the grease is shut off. Therefore, even if an erroneous operation or the like is done at the time of mounting, the grease will not be discharged from the nozzle.

When the holder body and the nozzle main unit are removed from the mount in order to do grease application work, the mount-time shutoff valve is opened in a linked manner with this operation. The flow passage of the grease is opened. Therefore, without especially performing an opening/closing operation of the mount-time shutoff valve, the operator is allowed to do grease application work immediately. Workload of the operator in grease application work is reduced.

With this mount-time shutoff valve being arranged on the mount, a member with a function of the mount-time shutoff valve may not be provided on the holder body. Therefore, it is possible to reduce the size and weight of the grease application device.

According to a grease application device of a tenth aspect of the present invention, the grease application device of the aforementioned first aspect may include: a bare area prevention sensor that counts a number of operations on the operation portion or a number of movements of the nozzle body shift portion to detect a number of executions of grease applications.

In this case, with the number of operations on the operation portion or the number of movements of the nozzle body shift portion being counted by the bare area prevention sensor, it is possible to detect the number of executions of grease applications. By comparing the required number of executions of grease applications with the number of executions of applications that have been detected by the bare area prevention sensor, it is possible to determine whether the required number of grease applications has been done or not.

This makes it possible to prevent bare areas.

The number of executions that is detected by the bare area prevention sensor may be displayed on a display portion such as a monitor.

Furthermore, a control device such as a computer may be used to determine whether the number of executions detected by the bare area prevention sensor is less than the required number of executions or not. In this case, based on the determination result, operations of various devices may be controlled. For example, in the case where workpieces are transferred by a work transfer device such as a conveyor, the control device may prevent the transfer mechanism for workpieces from moving if determining that the number of executions detected by the bare area prevention sensor is less than the required number of executions. In this case, based on the determination of the control device, it is possible to securely prevent bare areas.

A grease application method of an eleventh aspect of the present invention includes the steps of: taking up the grease application device according to any one of the aforementioned first to tenth aspects; operating the operation portion of the grease application device to cause the grease retention portion to retain the grease; inserting the first end portion of the nozzle body into an inner spline portion that is formed at an end portion of a workpiece; operating the operation portion to move the nozzle body to the second end portion side and also to cause the grease pressure-feed portion to discharge the grease from the nozzle, to thereby apply the grease to the inner spline portion; and pulling out the nozzle body from the workpiece.

In this case, after taking up the grease application device of the first aspect of the present invention, the operator causes the grease retention portion to retain the grease. Then, after inserting the first end portion of the nozzle body into the inner spline portion, the operator operates the operation portion. As a result, the nozzle body moves to the second end portion side, and the grease is discharged from the nozzle by the grease pressure-feed portion. A moving operation of the nozzle body and an operation of applying the grease to the inner spline portion are performed simultaneously. After this, when the nozzle body is pulled out from the workpiece, the operator is allowed to move the grease application device, which has been pulled out from the workpiece, to another workpiece, as required, to perform a grease application.

Therefore, with a simple operation of inserting the nozzle body into the inner spline portion and operating the operation portion, it is possible to apply a given amount of grease to a specific location that is determined by an arrangement of the nozzle.

The aforementioned grease application method is a grease application method that is allowed to be implemented by use of the grease application device according to any one of the aforementioned first to tenth aspects.

Advantage of the Invention

According to the grease application device and the grease application method according to the aforementioned aspects, an effect of easily and securely applying a given amount of grease into the groove of the inner spline portion is produced.

DESCRIPTION OF THE EMBODIMENTS

Hereinafter, embodiments of the present invention will be described with reference to the appended drawings. In all the drawings, even in the case of different embodiments, the same or equivalent members are denoted with the same reference signs, and the explanations common to the embodiments are omitted.

First Embodiment

A grease application device according to a first embodiment of the present invention will be described.

Figure 1:
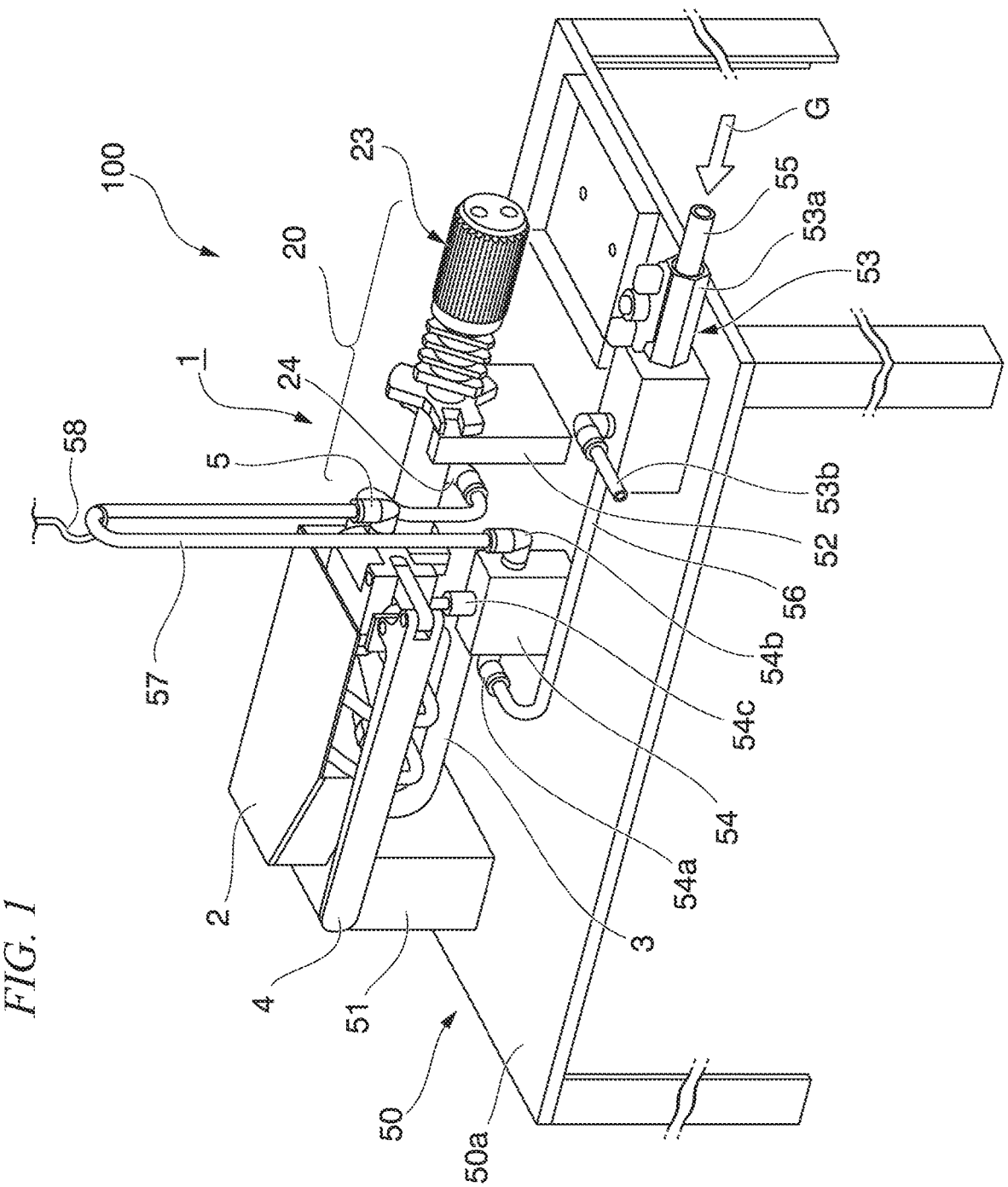
FIG. 1 is a schematic perspective view showing a general structure of a grease application device according to a first embodiment of the present invention.
Figure 2:
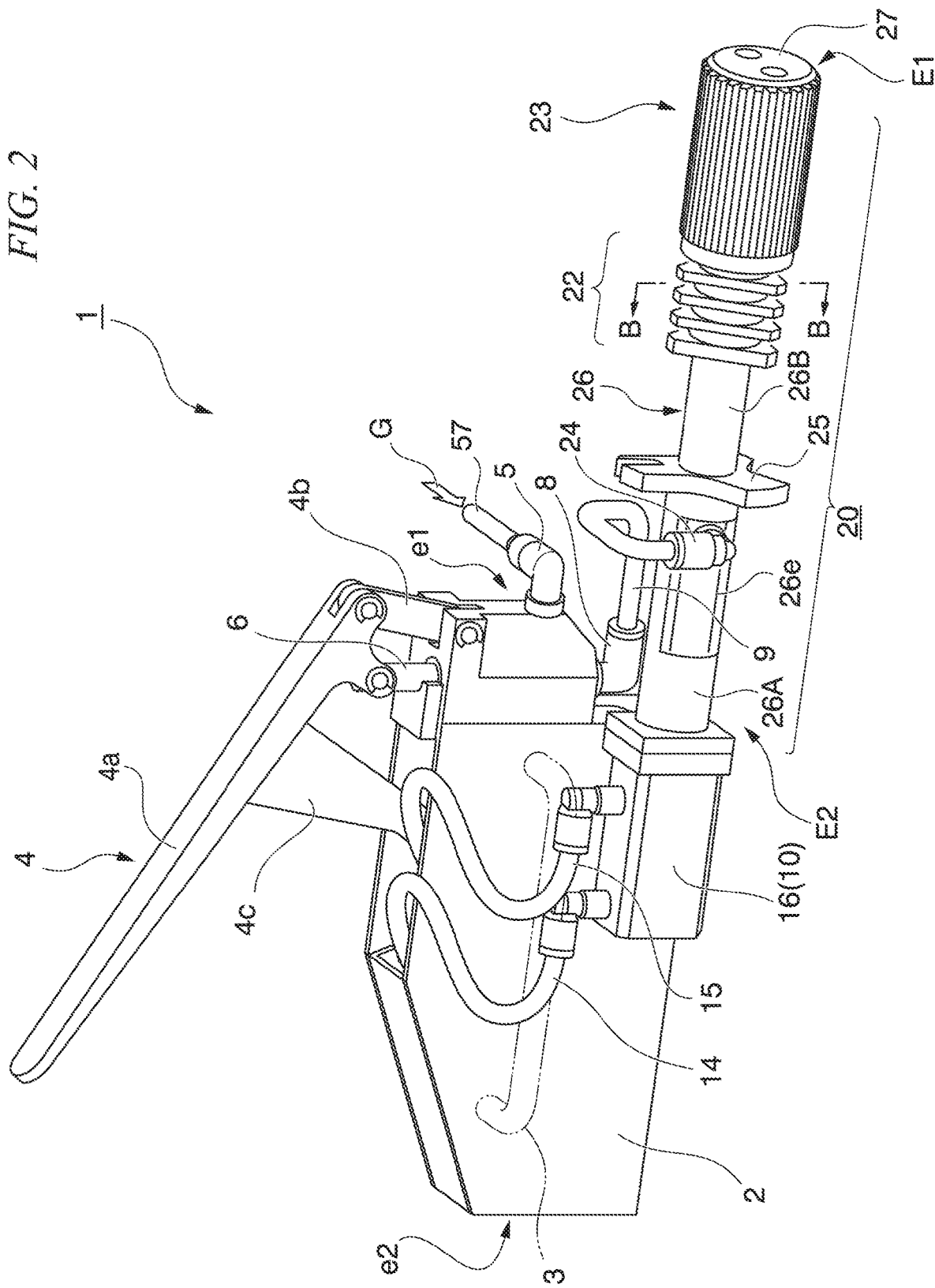
FIG. 2 is a schematic perspective view showing a structure of a main part of the grease application device according to the first embodiment of the present invention.
Figure 3:
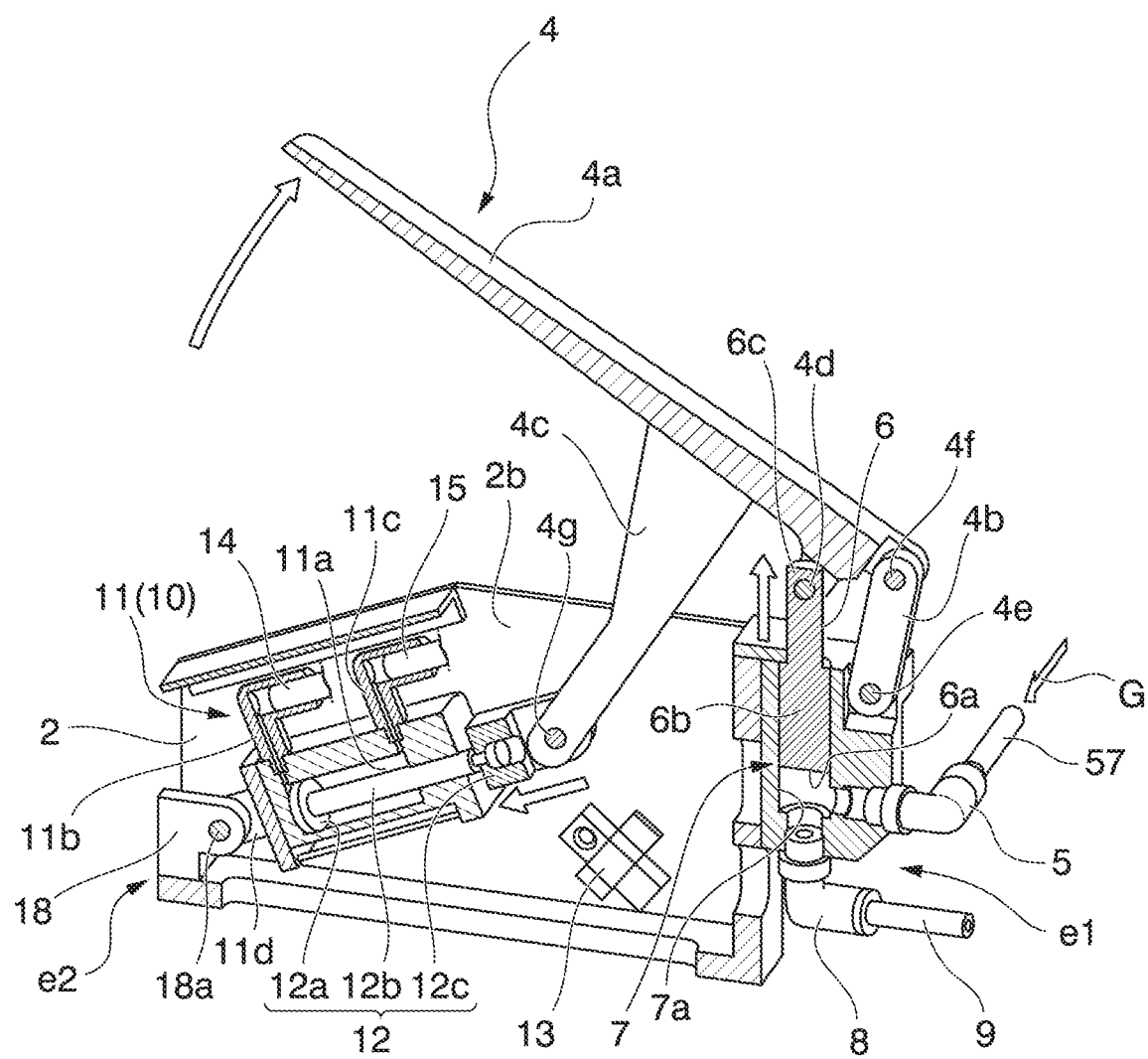
FIG. 3 is a partial cross-sectional view of a schematic perspective showing an internal structure of the main part of the grease application device according to the first embodiment of the present invention.
Figure 4:
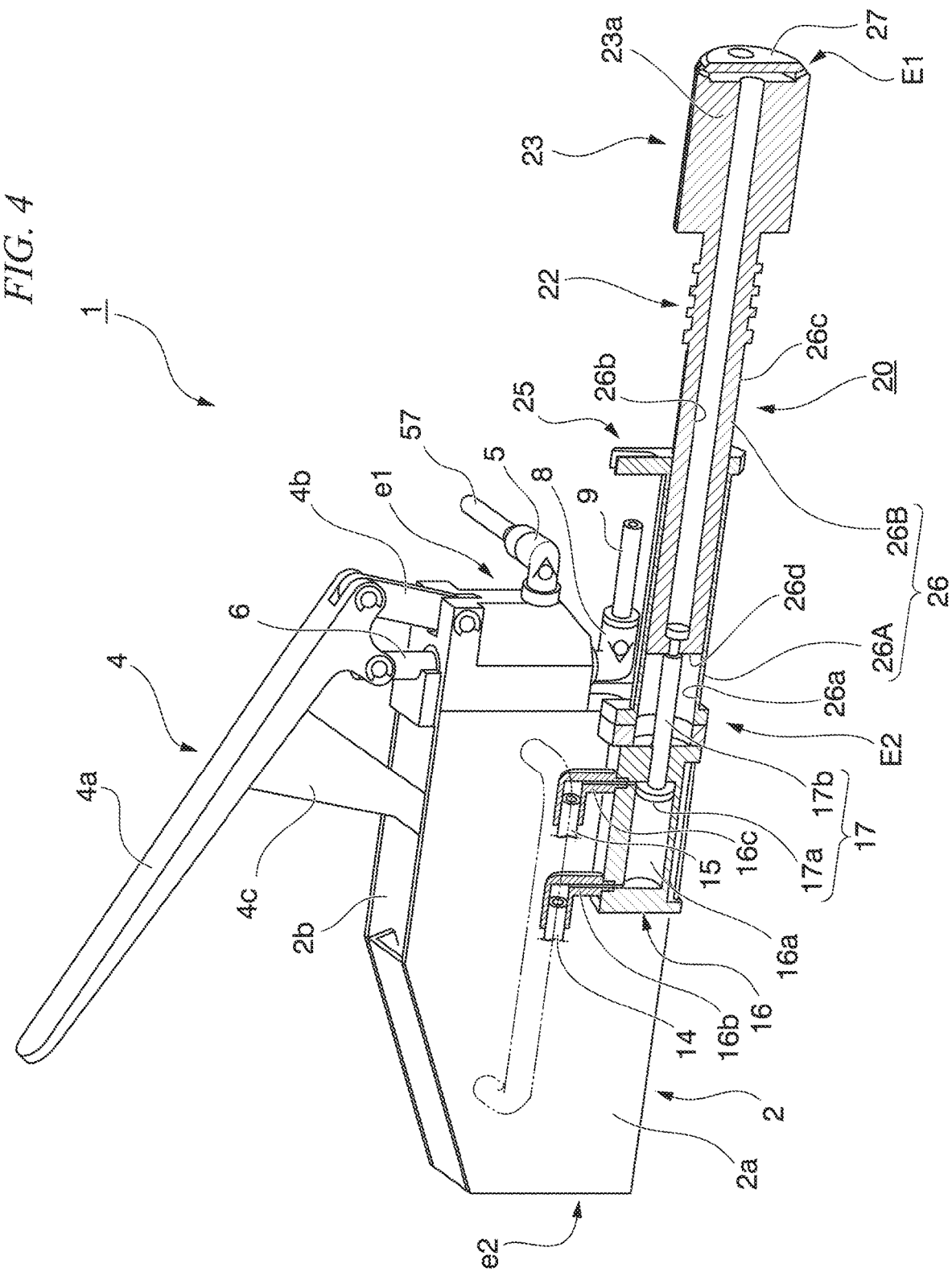
FIG. 4 a partial cross-sectional view of a schematic perspective showing an internal structure of a nozzle body of the grease application device according to the first embodiment of the present invention.
Figure 5:
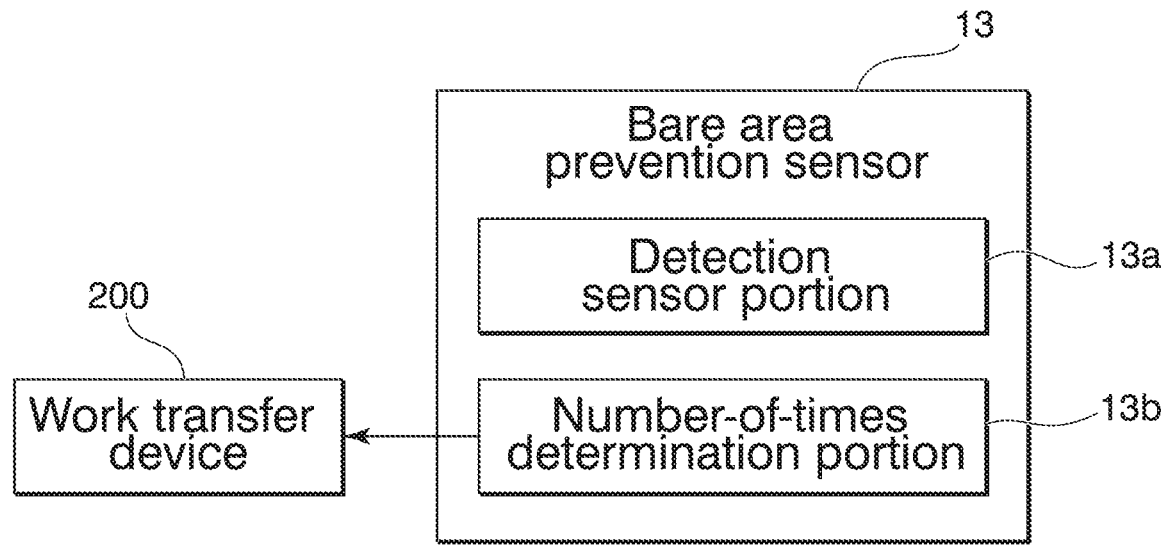
FIG. 5 is a block diagram showing an exemplary configuration of a bare area prevention sensor of the grease application device according to the first embodiment of the present invention.
Figure 6:
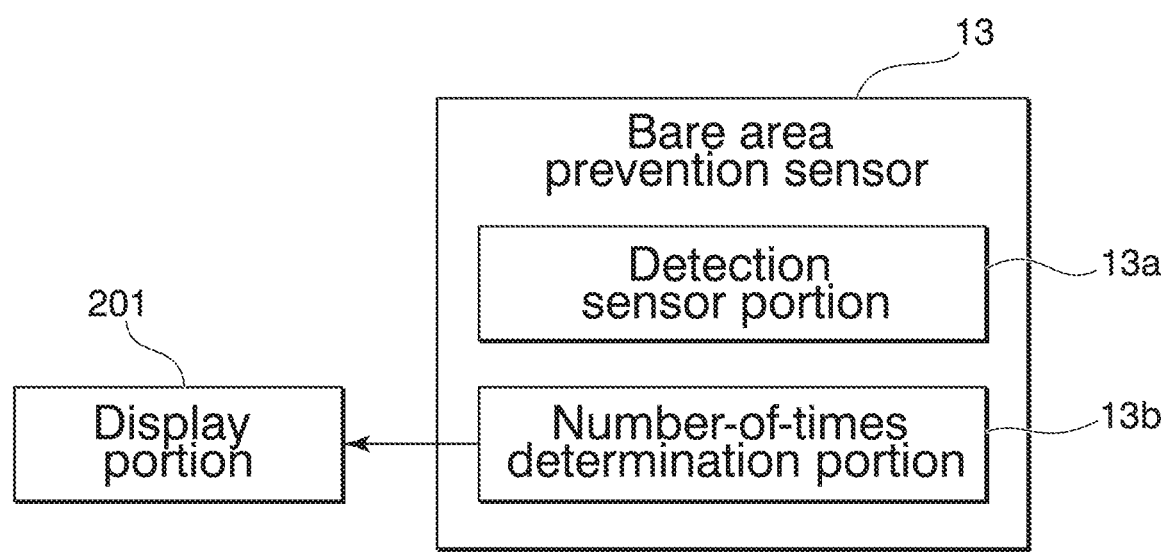
FIG. 6 is a block diagram showing an exemplary configuration of the bare area prevention sensor of the grease application device according to the first embodiment of the present invention.
Figure 7:
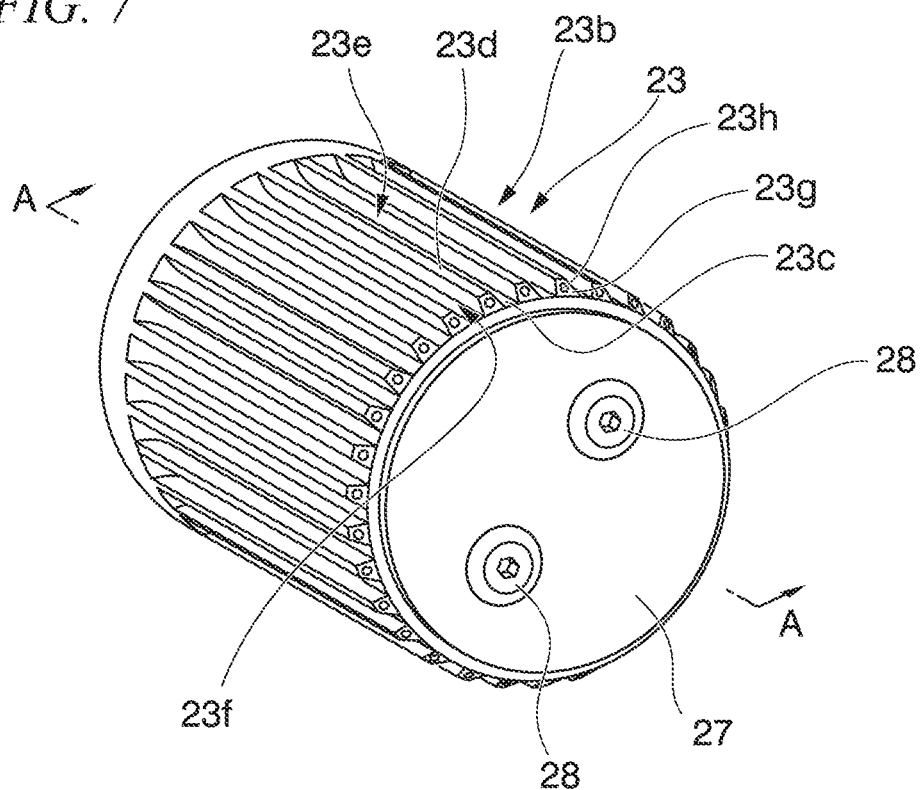
FIG. 7 is a schematic perspective view showing a first end portion of the nozzle body of the grease application device according to the first embodiment of the present invention.
Figure 8:
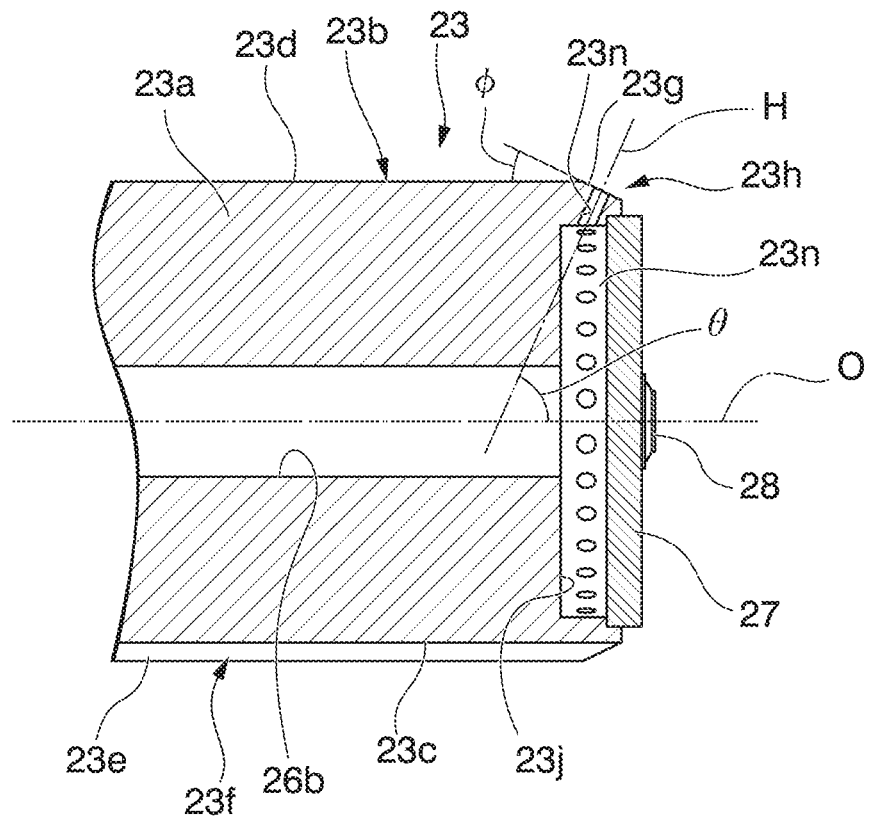
FIG. 8 is a cross-sectional view of FIG. 7, taken along A-A.
Figure 9:
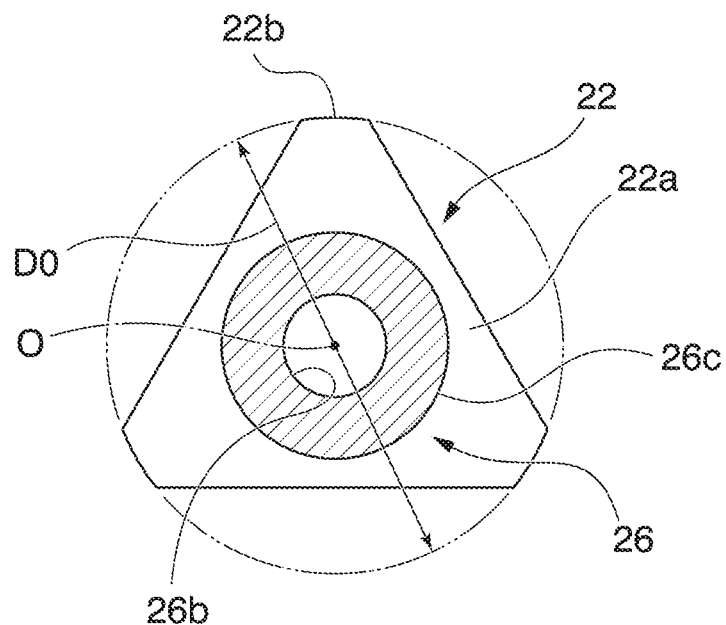
FIG. 9 is a cross-sectional view of FIG. 2, taken along B-B.
Figure 10:
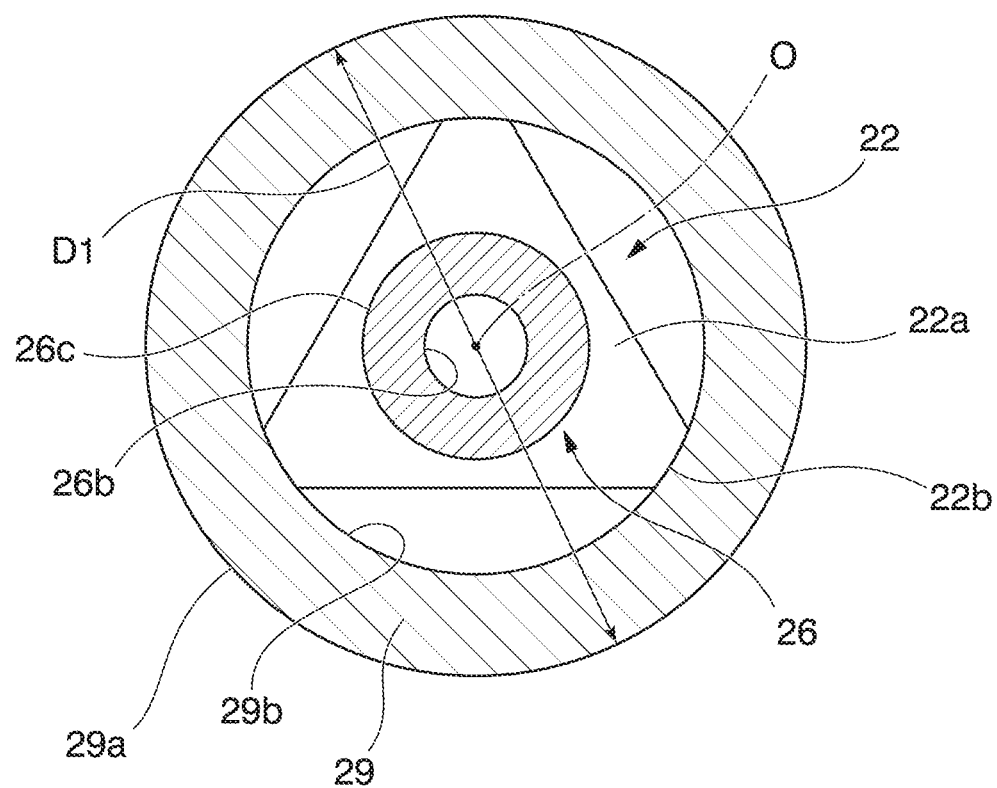
FIG. 10 is a schematic cross-sectional view showing how a collar is attached to a guide rib of the grease application device according to the first embodiment of the present invention.

FIG. 1 is a schematic perspective view showing a general structure of the grease application device according to the first embodiment of the present invention. FIG. 2 is a schematic perspective view showing a structure of a main part of the grease application device according to the first embodiment of the present invention. FIG. 3 is a partial cross-sectional view of a schematic perspective showing an internal structure of the main part of the grease application device according to the first embodiment of the present invention. FIG. 4 a partial cross-sectional view of a schematic perspective showing an internal structure of a nozzle body of the grease application device according to the first embodiment of the present invention. FIG. 5 is a block diagram showing an exemplary configuration of a bare area prevention sensor of the grease application device according to the first embodiment of the present invention. FIG. 6 is a block diagram showing another exemplary configuration of the bare area prevention sensor of the grease application device according to the first embodiment of the present invention. FIG. 7 is a schematic perspective view showing a first end portion of the nozzle body of the grease application device according to the first embodiment of the present invention. FIG. 8 is a cross-sectional view of FIG. 7, taken along A-A. FIG. 9 is a cross-sectional view of FIG. 2, taken along B-B. FIG. 10 is a schematic cross-sectional view showing how a collar is attached to a guide rib of the grease application device according to the first embodiment of the present invention.

As shown in FIG. 1, a grease application device 100 of the present embodiment includes: a mount 50; and a grease gun 1.

The grease application device 100 is a device that applies grease G to an interior of an inner spline portion that is formed on an end portion of a workpiece made of a variety of mechanical parts. The types of workpieces to which the grease application device 100 applies grease are not particularly limited so long as the workpiece is a mechanical part with an inner spline portion. Examples of workpieces to which the grease application device 100 is capable of applying grease include, for example, a transmission of a moving vehicle, an engine, and an outboard motor.

The mount 50 is a device portion on which the grease gun 1 is mounted when the grease gun 1 is not in use.

The mount 50 includes: a base plate 50a; a first support portion 51; a second support portion 52; a grease supply pipe connection portion 53; and a second shutoff valve 54 (mount-time shutoff valve).

The base plate 50a is supported by leg portions or the like so that its upper surface is at an appropriate height. The first support portion 51, the second support portion 52, the grease supply pipe connection portion 53, and the second shutoff valve 54 are arranged on the base plate 50a.

The first support portion 51 is erected on the base plate 50a. The first support portion 51 is a member that supports a holder body 2 (described later) of the grease gun 1 from below.

The second support portion 52 is erected on the base plate 50a. The second support portion 52 is a member that supports a nozzle body 20 (described later) of the grease gun 1 from below.

The first support portion 51 and the second support portion 52 are each provided with a reception portion (not shown in the figure) so as to support the grease gun 1 in a posture substantially parallel with the base plate 50a. Each reception portion positions the position of the grease gun 1 on a plane parallel with the base plate 50a to a predetermined position.

Hereinafter, a state in which the grease gun 1 is mounted at the predetermined positions of the first support portion 51 and the second support portion 52 is referred to as mount state. A case where the grease gun 1 is not mounted on the first support portion 51 and the second support portion 52 or where even if mounted, the grease gun 1 is mounted at positions different from the predetermined positions is referred to as mount-release state. In FIG. 1, the grease gun 1 in the mount state is shown.

To the grease supply pipe connection portion 53, there is coupled a grease supply pipe 55 that is connected to, for example, a grease supply source such as a pail (not shown in the figures).

The grease supply pipe connection portion 53 includes: a first shutoff valve 53a that shuts off the supply of the grease G from the grease supply pipe 55 as required; and an air vent valve 53b that vents the air in the pipe passage.

The first shutoff valve 53a can be opened and shut off at appropriate timings through an operation by the operator. For example, in the case where after completion of grease application work, second grease application work is not started immediately, it is possible for the operator to perform an operation of shutting off the first shutoff valve 53a.

The second shutoff valve 54 is a device portion that switches between shutoff and open of a flow passage of the grease G that is supplied through the grease supply pipe connection portion 53. The second shutoff valve 54 switches between shutoff and open of the flow passage of the grease G in a linked manner with the mount state and mount-release state of the grease gun 1. In the mount state of the grease gun 1, the second shutoff valve 54 shuts off the flow passage of the grease G In the mount-release state of the grease gun 1, the second shutoff valve 54 opens the flow passage of the grease G.

The second shutoff valve 54 includes, in addition to a valve main unit (not shown in the figure), an inlet-side pipe joint 54a, an outlet-side pipe joint 54b, and a mount state detection switch 54c.

For example, as a structure of the valve main unit of the second shutoff valve 54, a grooved rod, a return spring, or the like may be listed.

The inlet-side pipe joint 54a is provided on an inlet side of the valve main unit. To the inlet-side pipe joint 54a, there is coupled a pipe 56 that is connected to an outlet side of the grease supply pipe connection portion 53.

The outlet-side pipe joint 54b is provided on an outlet side of the valve main unit. When the valve main unit is opened, the outlet-side pipe joint 54b supplies the grease G to the grease gun 1. To the outlet-side pipe joint 54b, there is coupled a grease supply tube 57 that is connected to the grease gun 1.

The grease supply tube 57 has an appropriate length that allows the grease gun 1 to move to a position away from the mount 50. The grease supply tube 57 is formed of a material that endures an inner pressure of the grease flowing thereinside and that has flexibility. In the present embodiment, the grease supply tube 57 is hung on a hook 58 (hanger member) that is coupled to a ceiling (not shown in the figures). The grease supply tube 57 has a length that is obtained by adding a length of a slack for hanging on the hook 58 to a length of a radius required for the grease gun 1 to move.

The hook 58 may be fixed to the ceiling. The hook 58 may be provided so as to be movable horizontally or vertically with respect to the ceiling. The hook 58 may be provided with a reel mechanism that is capable of increasing/decreasing a reel-out length.

The mount state detection switch 54c is a switch for detecting the mount state and mount-release state of the grease gun 1 on the first support portion 51 and the second support portion 52.

If the mount state is detected by the mount state detection switch 54c, then the second shutoff valve 54 closes the valve main unit to shut off the flow passage of the grease G If the mount-release state is detected by the mount state detection switch 54c, then the second shutoff valve 54 opens the valve main unit to open the flow passage of the grease G.

As for the type of the mount state detection switch 54c, a contact-type switch may be used that is brought into abutment with the grease gun 1 in the mount state, or alternatively, a non-contact-type switch may be used that is not brought into abutment with the grease gun 1.

In the case of a contact-type switch, a mechanical switch may be used in which a depressing pressure from a contact piece in abutment with the grease gun 1 is converted to a drive force for a valve operation on the second shutoff valve 54 via a power transmission mechanism such as, for example, a lever, a link, a gear, or a hydraulic circuit.

For example, in the case where the second shutoff valve 54 has a structure in which the flow passage of the grease G is opened and closed by a valve body that is biased by an elastic body such as a spring, the mount state detection switch 54c may be made of a shaft-like member that is coupled to the valve body of the second shutoff valve 54 and that moves the valve body in a linked manner with the mount state of the grease gun 1. In this case, if no load is applied to the shaft-like member from the grease gun 1, the valve body is biased by the elastic body to shut off the flow passage of the grease G. When the shaft-like member is depressed by the grease gun 1, the valve body is moved to open the flow passage of the grease G.

For example, in the case where the second shutoff valve 54 is a solenoid valve, or where the second shutoff valve 54 has an electric actuator for opening/closing the valve, a contact-type or non-contact-type electric switch, which turns on and off the electrical contact by means of a member to be in abutment with the grease gun 1, may be adopted as the mount state detection switch 54c.

As a non-contact-type switch used for the mount state detection switch 54c, a switch that uses a photosensor or an electromagnetic sensor is available.

In the present embodiment, as the mount state detection switch 54c, a proximity switch is used, by way of example.

As shown in FIG. 2, the grease gun 1 includes: a holder body 2 (support body); and a nozzle body 20. The grease gun 1 is a so-called handgun-type device. The grease gun 1 has a size and a weight that allow the operator to carry with ease.

The holder body 2 is a device portion that allows the operator to hold the grease gun 1 in a movable manner. Here, to allow the operator to hold the grease gun 1 in a movable manner means that it is movable together with the operator. In this, there is also included, for example, in addition to the case where the device is held by the operator with his or her hand, the case where the device is held by the operator by use of a support such as a shoulder belt in a manner movable with the operator.

In the present embodiment, the holder body 2 has a box-like shape, by way of example. The holder body 2 has side surfaces 2a, 2b with a substantially rectangular outline that is long in one direction. The holder body 2 is formed in a flattened box shape with a substantially constant thickness in a direction orthogonal to the side surfaces 2a, 2b. Hereinafter, both ends of the holder body 2 in the longitudinal direction are referred to as first end portion e1 and second end portion e2. A the direction orthogonal to the longitudinal direction within a plane parallel to the side surfaces 2a, 2b is sometimes referred to as transverse direction, and a direction orthogonal to the side surfaces 2a, 2b is sometimes referred to as thickness direction.

The side surface 2a of the holder body 2 is provided with a handle 3 for the operator to have in hand.

As shown in FIG. 3, inside the holder body 2, there are arranged: a grease retention portion 7; a piston 6 (grease pressure-feed portion); an operation lever 4 (operation portion); a first cylinder 11; and a bare area prevention sensor 13.

As shown in FIG. 4, outside the holder body 2, there is arranged a second cylinder 16 on the side surface 2a.

The first cylinder 11 and the second cylinder 16 form a nozzle body shift portion 10.

As shown in FIG. 3, the grease retention portion 7 is a device portion that retains the grease G discharged from a nozzle 23n (described later) (see FIG. 4) of the grease gun 1. The grease retention portion 7 is provided in the first end portion e1 of the holder body 2.

The grease retention portion 7 is made of a cylinder 7a (measurement chamber) whose internal surface is cylindrical. The cylinder 7a extends in the transverse direction of the holder body 2.

In a first end portion (an upper end portion as illustrated in FIG. 3) of the cylinder 7a, there is formed an opening.

To a side of a second end portion (a lower end portion as illustrated in FIG. 3) of the cylinder 7a, there is connected a first check valve 5. To a front end of the second end portion of the cylinder 7a, there is connected a second check valve 8.

To the first check valve 5, the grease supply tube 57 is connected. The first check valve 5 is a one-way valve that supplies the grease which is pressure-fed from the outlet-side pipe joint 54b into the grease supply tube 57, to the cylinder 7a. Therefore, the first check valve 5 prevents a reverse flow of the grease G from the cylinder 7a toward the grease supply tube 57.

To the second check valve 8, there is connected a pipe 9 that is connected to the nozzle body 20 (described later). The second check valve 8 is a one-way valve that supplies the grease which is supplied into the cylinder 7a and is pressured by the piston 6 (described later), to the pipe 9. Therefore, the second check valve 8 prevents a reverse flow of the grease G from the pipe 9 toward the cylinder 7a.

Into the cylinder 7a, the piston 6 is inserted through the opening of the first end portion of the cylinder 7a.

At a front end portion (a lower end portion as illustrated in FIG. 3) of the piston 6, there is provided a piston head 6a that is fitted into the cylinder 7a so as to be slidable and liquid-tight along an axis line of the cylinder 7a. At a base end portion (an upper end portion as illustrated in FIG. 3) of the piston 6, there extends a piston shaft 6b from a base end of the piston head 6a. At a base end of the piston shaft 6b, there is provided a coupling portion 6c that is coupled to the operation lever 4 (described later).

By receiving an operational force from the operation lever 4 (described later) through the coupling portion 6c, the piston 6 moves forward or rearward in the cylinder 7a in an axis direction of the cylinder 7a.

The operation lever 4 includes: a lever main unit 4a; a coupling rod 4b; and an arm 4c.

The lever main unit 4a is a long and slim, rod-like or plate-like member on which the operator performs an operation.

To a first end portion of the lever main unit 4a, the coupling rod 4b is coupled. The lever main unit 4a is coupled to the first end portion e1 of the holder body 2 via the coupling rod 4b.

In both end portions of the coupling rod 4b, there are provided: a rotational joint 4e that is rotatably coupled to the holder body 2; and a rotational joint 4f that is rotatably coupled to the first end portion of the lever main unit 4a. The coupling rod 4b and the lever main unit 4a rotate within a plane parallel with the side surfaces 2a, 2b.

The arm 4c is a plate-like member that transmits a rotational movement of the lever main unit 4a to the first cylinder 11 (described later) in the holder body 2. The arm 4c protrudes at a middle portion of the lever main unit 4a in the longitudinal direction toward the inner side of the holder body 2.

In a front end portion of the arm 4c in a protrusion direction, there is provided a rotational joint 4g that is rotatably coupled to the first cylinder 11 (described later).

In a portion of the lever main unit 4a between the rotational joint 4f and a base end portion of the arm 4c in the longitudinal direction of the lever main unit 4a, there is provided a rotational joint 4d. The rotational joint 4d is rotatably coupled to the coupling portion 6c of the piston 6.

A translational movement of the rotational joint 4d is restrained to a direction of movement the cylinder 7a and the piston head 6a. Therefore, with the rotational movement of the lever main unit 4a, the rotational joint 4d moves along the axis line of the cylinder 7a.

The coupling rod 4b, which couples the lever main unit 4a to the holder body 2, has degrees of rotational freedom about the rotational joints 4e, 4f. Therefore, the lever main unit 4a is capable of doing smooth rotational movement about the rotational joint 4d.

The nozzle body shift portion 10 is a power transmission mechanism that converts a rotational movement of the operation lever 4 to a linear movement and transmits it to the nozzle body 20. In the present embodiment, as the nozzle body shift portion 10, a power transmission mechanism using a hydraulic pressure is adopted, by way example.

Therefore, the nozzle body shift portion 10 is capable of operating without using an auxiliary power such as, for example, an electric power.

The nozzle body shift portion 10 of the present embodiment is made of: the first cylinder 11 that converts a rotational movement of the operation lever 4 to a linear movement; and the second cylinder 16 (see FIG. 4) that converts the linear movement, which has been converted by the first cylinder 11, to a linear movement along a given direction.

As shown in FIG. 3, the first cylinder 11 is made of a cylindrical member that extends in one direction. The first cylinder 11 is arranged in an interior of the holder body 2.

On a first end portion of the first cylinder 11, there is provided a coupling portion 11d. The first cylinder 11 is coupled to a rotation support portion 18 via the coupling portion 11d. The rotation support portion 18 is provided in an interior of the second end portion e2 of the holder body 2.

The coupling portion 11d and the rotation support portion 18 are rotatably coupled to each other via a rotational joint 18a. Therefore, the first cylinder 11 is capable of rotating about the rotational joint 18a.

Hereinafter, as for end portions of the first cylinder 11 in the longitudinal direction, an end portion that is coupled to the rotation support portion 18 is referred to as base end portion, and an end portion opposite to the base end portion is referred to as front end portion. In the longitudinal direction of the first cylinder 11, a side relatively closer to the base end portion is sometimes referred to as base end side while a side relatively closer to the front end portion is sometimes referred to as front end side.

The first cylinder 11 includes: a first cylinder chamber 11a; a first tube joint 11b; a second tube joint 11c; and a first piston 12.

The first cylinder chamber 11a is formed in a cylindrical shape that is extended, in an interior of the first cylinder 11, in the longitudinal direction of the first cylinder 11. Into the first cylinder chamber 11a, there is introduced a fluid (not shown in the figures) that produces a hydraulic pressure.

To the first tube joint 11b, there is coupled a coupling tube 14. A pipe passage in the first cylinder 11, which is in communication with the first tube joint 11b, opens in the base end side of the first cylinder chamber 11a to be in communication with the first cylinder chamber 11a.

To the second tube joint 11c, there is coupled a coupling tube 15. A pipe passage in the first cylinder 11, which is in communication with the second tube joint 11c, opens in the front end side of the first cylinder chamber 11a to be in communication with the first cylinder chamber 11a.

The first piston 12 includes: a piston head 12a; a shaft portion 12b; and a coupling portion 12c.

The piston head 12a is fitted into the first cylinder chamber 11a so as to be slidable and liquid-tight along an axis line of the first cylinder chamber 11a. When the position of the piston head 12a changes in the direction along the axis line of the first cylinder chamber 11a, a volume on the base end side in the first cylinder chamber 11a and a volume on the front end side change, with the piston head 12a being a boundary between the two.

The shaft portion 12b is extended from the piston head 12a to the front end side of the first cylinder 11. The shaft portion 12b penetrates through the end portion on the front end side of the first cylinder 11 and protrudes to the outside. In the first cylinder 11, a penetration hole through which the shaft portion 12b penetrates is liquid-tightly sealed by a seal material (not shown in the figures).

The shaft portion 12b has a length that allows the piston head 12a to move in the range of the whole length of the first cylinder chamber 11a while the shaft portion 12b is protruded from the first cylinder 11.

The coupling portion 12c is provided on an end portion of the shaft portion 12b that has penetrated through the front end portion of the first cylinder 11. The coupling portion 12c is rotatably coupled to a front end portion of the arm 4c in the protrusion direction via the rotational joint 4g.

As shown in FIG. 4, the second cylinder 16 is made of a cylindrical member that extends in one direction. The second cylinder 16 is fixed to the side surface 2a on the first end portion e1 side of the holder body 2. The longitudinal direction of the second cylinder 16 is substantially the same (including the same) as that of the holder body 2.

Hereinafter, in end portions of the second cylinder 16 in the longitudinal direction, an end portion on the first end portion e1 side of the holder body 2 is referred to as front end portion, and an end portion opposite to the front end portion (on the second end portion e2 side) is referred to as base end portion. In the longitudinal direction of the second cylinder 16, a side relatively closer to the base end portion is sometimes referred to as base end side while a side relatively closer to the front end portion is sometimes referred to as front end side.

The second cylinder 16 includes: a second cylinder chamber 16a; a first tube joint 16b; a second tube joint 16c; and a second piston 17.

The second cylinder chamber 16a is formed in a cylindrical shape that is extended, in an interior of the second cylinder 16, in the longitudinal direction of the second cylinder 16.

The first tube joint 16b is coupled to a second end of the coupling tube 14 that is connected to the first tube joint 11b of the first cylinder 11. A pipe passage in the second cylinder 16, which is in communication with the first tube joint 16b, opens in the base end side of the second cylinder chamber 16a to be in communication with the second cylinder chamber 16a.

The second tube joint 16c is coupled to a second end of the coupling tube 15 that is connected to the second tube joint 11c of the first cylinder 11. A pipe passage in the second cylinder 16, which is in communication with the second tube joint 16c, opens in the front end side of the second cylinder chamber 16a to be in communication with the second cylinder chamber 16a.

The second piston 17 includes: a piston head 17a; and a shaft portion 17b.

The piston head 17a is fitted into the second cylinder chamber 16a so as to be slidable and liquid-tight along an axis line of the second cylinder chamber 16a. When the position of the piston head 17a changes in the direction along the axis line of the second cylinder chamber 16a, a volume on the base end side in the second cylinder chamber 16a and a volume on the front end side change, with the piston head 17a being a boundary between the two.

The shaft portion 17b is extended from the piston head 17a to the front end side of the first piston 12. The shaft portion 17b penetrates through the end portion on the front end side of the first piston 12 and protrudes. In the second cylinder 16, a penetration hole through which the shaft portion 17b penetrates is liquid-tightly sealed by a seal material (not shown in the figures).

The shaft portion 17b has a length that allows the piston head 17a to move in the range of the whole length of the second cylinder chamber 16a while the shaft portion 17b is protruded from the second cylinder 16.

The front end portion of the shaft portion 17b is coupled to an inner cylindrical portion 26B (described later) of the nozzle body 20.

The bare area prevention sensor 13 counts the number of operations on the operation lever 4 or the number of movements of the nozzle body shift portion 10, to thereby detect the number of executions of grease application.

As shown in FIG. 5, the bare area prevention sensor 13 includes: a detection sensor portion 13a; and a number-of-times determination portion 13b.

The detection sensor portion 13a detects a position of a member related to the operation of the operation lever 4 or the nozzle body shift portion 10.

In the present embodiment, in the case of performing an operation of closing the operation lever 4 most, the bare area prevention sensor 13 detects, in the position in the first cylinder 11 where the coupling portion 12c reaches, the number of times the coupling portion 12c reaches. In the case of performing an operation of closing the operation lever 4 most, the position in the first cylinder 11 where the coupling portion 12c reaches is a position of the coupling portion 12c when a grease application finishes in a single operation on the operation lever 4 (hereinafter, referred to as application finish position), which will be described later.

Therefore, at least the detection sensor portion 13a of the bare area prevention sensor 13 is arranged at a position in the holder body 2 where the detection sensor portion 13a is capable of detecting that the coupling portion 12c has reached the application finish position.

The number-of-times determination portion 13b counts the detection outputs from the detection sensor portion 13a, to thereby detect the number of executions of grease application. Furthermore, the number-of-times determination portion 13b compares the required number of grease applications, which is previously stored, with the number of the detected executions to determine whether the grease application has finished or not.

If it is determined that the grease application has finished, then the number of executions is cleared.

If it is determined that the grease application has not finished, then a control signal is generated that performs an operation for preventing bare areas.

For example, as shown in FIG. 5, in the case where the bare area prevention sensor 13 is communicably connected to a work transfer device 200 that transfers workpieces, the bare area prevention sensor 13 may send out a control signal for stopping the movement of the work transfer device 200 to the work transfer device 200. In this case, while the operator does not finish the grease application to all the areas of a workpiece that need grease application, another workpiece will not be transferred. Therefore, bare areas without grease are prevented.

As examples of work transfer device 200, for example, a conveyor, a transfer robot, and so on are listed.

Control by use of the bare area prevention sensor 13 is not limited to control over the work transfer device 200. For example, as shown in FIG. 6, in the case where the bare area prevention sensor 13 is connected to a display portion 201, the bare area prevention sensor 13 may send out a control signal that causes the display portion 201 to show a display for preventing bare areas.

As for types of the display portion 201, for example the display portion 201 may be: a monitor that displays letters, image information, and the like; a light emitter such as a lamp; or the like.

As for a display method of the display portion 201, for example, in the case where the display portion 201 is a monitor, a display may be used such as a warning message, a warning mark, or the like to the effect that the number of executions detected by the bare area prevention sensor 13 or that the number of the detected executions has not reached the predetermined number times. In the case where the display portion 201 is a light emitter such as a lamp, for example, a display may be used such as one that illuminates when the number of executions detected by the bare area prevention sensor 13 reaches a predetermined value, or one in which the color of light is switched between when the number of the detected executions is less than a predetermined value and after the number of the detected executions reaches the predetermined value.

This display portion 201 may be provided at an appropriate location that the operator can see. The display portion 201 may be provided in the grease application device 100, or may be provided in a device different from the grease application device 100. If provided in the grease application device 100, the display portion 201 may be provided integrally with the grease gun 1 or may be provided separately from the grease gun 1.

As shown in FIG. 2, the nozzle body 20 is a shaft-like member. In its longitudinal direction, the nozzle body 20 includes: a first end portion E1; and a second end portion E2. At the second end portion E2, the nozzle body 20 is connected to a front end portion of the second cylinder 16. The nozzle body 20 extends in the longitudinal direction of the holder body 2. Hereinafter, when relative positions in the nozzle body 20 are described, a position on the first end portion E1 side is sometimes referred to as a front end side, and a position on the second end portion E2 side is sometimes referred to as a base end side.

From the second end portion E2 to the first end portion E1, the nozzle body 20 includes: a shaft portion 26; and a nozzle body head 23. On a portion of the shaft portion 26 that is adjacent to the nozzle body head 23, there is formed a guide portion 22.

As shown in FIG. 4, the shaft portion 26 includes: an outer cylindrical portion 26A; and an inner cylindrical portion 26B.

The outer cylindrical portion 26A is a cylindrical member that extends in the longitudinal direction of the nozzle body 20. The outer cylindrical portion 26A is arranged at the second end portion E2 of the nozzle body 20. The outer cylindrical portion 26A is fixed to a front end portion of the second cylinder 16.

An inner circumferential surface 26a of the outer cylindrical portion 26A is fitted onto the inner cylindrical portion 26B (described later) so as to be slidable in an axis direction of the inner circumferential surface 26a. An inner diameter of the inner circumferential surface 26a is larger than an outer diameter of the shaft portion 17b of the second piston 17. The second piston 17 allows the shaft portion 17b, which is protruded from the second cylinder 16, to penetrate through its interior.

As shown in FIG. 2, at a front end portion of the outer cylindrical portion 26A, there is provided an abutment plate 25 that protrudes radially outwardly from an outer circumferential side.

In a side surface of the outer cylindrical portion 26A in the middle portion in the longitudinal direction, there is formed an opening portion 26e that extends in the longitudinal direction of the outer cylindrical portion 26A. The opening portion 26e is opened longer than the range of movement of the inner cylindrical portion 26B in the longitudinal direction.

As shown in FIG. 4, the inner cylindrical portion 26B is a cylindrical member that is slidably inserted into the inner circumferential surface 26a of the outer cylindrical portion 26A. A front end side of the inner cylindrical portion 26B is protruded further than the outer cylindrical portion 26A.

In an interior of the inner cylindrical portion 26B, there is formed a grease flow passage 26b that extends in the longitudinal direction of the inner cylindrical portion 26B and allows the grease G to flow therethrough. The grease flow passage 26b is closed on a base end side of the inner cylindrical portion 26B. On the front end side of the inner cylindrical portion 26B, the grease flow passage 26b is extended to penetrate through the nozzle body head 23 (described later).

As shown in FIG. 2, on a side surface of the inner cylindrical portion 26B on the base end side, in a region that overlaps the opening portion 26e of the outer cylindrical portion 26A, there is provided a grease injection portion 24. The grease injection portion 24 penetrates through an outer circumferential surface of the inner cylindrical portion 26B to be in communication with the grease flow passage 26b. The grease injection portion 24 protrudes from the opening portion 26e to the outside. To the grease injection portion 24, there is connected an end portion of the pipe 9 via a pipe joint. Between the second check valve 8 and the grease injection portion 24, there is formed a flow passage of grease for which the pipe 9 is used.

As shown in FIG. 4, to a base end surface 26d of the inner cylindrical portion 26B, the shaft portion 17b of the second piston 17 is fixed. Therefore, when the second piston 17 moves in the axis direction, the inner cylindrical portion 26B together with the second piston 17 moves in the axis direction of the inner circumferential surface 26a of the outer cylindrical portion 26A.

The nozzle body head 23 forms the first end portion E1 of the nozzle body 20. The nozzle body head 23 is a shaft body insertable into an inner spline portion that is formed on an end portion of a workpiece onto which a grease application is executed (hereinafter, referred to as workpiece inner spline portion). The nozzle body head 23 has a nozzle body main unit 23a, which is formed on or connected to the front end of the inner cylindrical portion 26B.

As shown in FIG. 7, FIG. 8, around an outer circumferential portion of the nozzle body main unit 23a of the nozzle body head 23, there is formed a spline 23b that engages the workpiece inner spline portion.

The shape of the spline 23b is not particularly limited so long as the spline 23b has a spline shape that is capable of engaging the workpiece inner spline portion. For example, in the case where the workpiece inner spline portion has an involute spline shape, the spline 23b may have an involute spline shape that engages this.

In the case where an engaging shape other than that of the inner spline portion is formed on the workpiece, the spline 23b may be also provided with an engaging shape corresponding thereto. However, if the engagement portion of the workpiece is one that does not require a grease application such as, for example, a key groove for fixation, then on an engagement portion corresponding thereto, no nozzle 23n (described later) is formed.

The spline 23b has a plurality of tooth portions 23e that is each engaged in each groove of the workpiece inner spline portion. In the spline 23b, between tooth portions 23e in each adjacent pair, there are each formed groove portions 23f with which each tooth portion of the workpiece inner spline portion is engaged.

On a radially outer side of each tooth portion 23e, there is formed a large-diameter surface 23d.

On a bottom portion of each groove portion 23f, there is formed a small-diameter surface 23c.

The large-diameter surfaces 23d and the small-diameter surfaces 23c are formed on concentric circles both about a central axis line O of the nozzle body head 23.

A front end side of each tooth portion 23e of the nozzle body head 23 along the axis line, there is formed an inclined surface 23g.

As shown in FIG. 8, in a direction from the second end portion E2 toward the first end portion E1, the inclined surface 23g is inclined from the outer circumferential side toward the center of the nozzle body head 23. In the present embodiment, an inclination angle of the inclined surface 23g with respect to the central axis line O of the nozzle body head 23 (an acuter angle of the two) has a given value φ.

The magnitude of φ may be, for example, not less than 15° and not more than 45°.

At a front end of the nozzle body head 23, there is formed a front recess portion 23j, which is a cylindrical hole about the central axis line O. An inner diameter of the front recess portion 23j is larger than that of the grease flow passage 26b. At a center portion of the front recess portion 23j, the grease flow passage 26b that is extended from the inner cylindrical portion 26B opens.

An opening of the front recess portion 23j on the front end side is sealed tightly by a disk-like lid member 27. The lid member 27 is fixed to the nozzle body main unit 23a with screws 28.

In the nozzle body main unit 23a, there are formed nozzles 23n that discharge grease into the grooves of the workpiece inner spline portion. The nozzle 23n extends radially outwardly from the side surface of the front recess portion 23j, and opens in the inclined surface 23g after passing through the tooth portion 23e.

Of the tooth portions 23e, the nozzle 23n may be provided only in the tooth portions 23e that engage the inner spline portion to which grease is to be applied. For example, in the case where a tooth portion 23e is to be engaged with or inserted into a portion that does not require grease application such as a key groove provided in the workpiece, no nozzle 23n is formed in this tooth portion 23e.

In the present embodiment, each tooth portion 23e is provided with a single nozzle 23n, by way of example.

The nozzles 23n are formed radially about the central axis line O when seen in the direction along the central axis line O.

Each nozzle 23n is a hole portion that inclines from the interior of the nozzle body main unit 23a toward the outer circumferential side, in the direction from the second end portion E2 toward the first end portion E1. In the present embodiment, an inclination angle of a central axis line H of the nozzle 23n with respect to the central axis line O of the nozzle body head 23 (an acuter angle of the two) has a given value θ.

The magnitude of θ may be, for example, not less than 45° and not more than 75°.

It is more preferable that the sum of θ and φ be substantially 90° (inclusive of the case of 90°). In this case, it is possible to machine the nozzle 23n from the direction substantially orthogonal (inclusive of the case of the right angle) to the inclined surface 23g This makes the machining easy.

As shown in FIG. 2, the guide portion 22 includes a guide rib 22a that protrudes from an outer circumferential surface 26c of the shaft portion 26 to a radially outer side. In the present embodiment, a plurality of guide ribs 22a are provided so as to be spaced from each other in the axis direction.

As shown in FIG. 9, each guide rib 22a is formed in a plate-like shape that is extended in a direction orthogonal to the central axis line O of the shaft portion 26. An outline of the guide rib 22a when seen in the direction along the central axis line O of the shaft portion 26 has a substantially equilaterally triangular shape. However, at portions corresponding to the apex angles of the equilaterally triangular shape, there are formed outer circumferential surfaces 22b that are rounded in an arc shape with a radius of D0/2 about the central axis line O.

The radius D0/2 of the outer circumferential surfaces 22b is larger than an outer radius of the large-diameter surfaces 23d of the nozzle body head 23.

If an end of a workpiece has a hole portion with an inner diameter of d0 (where d0≥D0) that is formed on a more proximal side than the inner spline portion so as to be coaxially with the inner spline portion, then the magnitude of D0 may be set to a dimension that allows the guide portion 22 to be slidably fitted into the hole portion.

In this case, when the nozzle body head 23 is inserted into a workpiece, the nozzle body head 23 is inserted into the inner spline portion while the guide portion 22 is fitted into the hole portion on the proximal side of the workpiece inner spline portion. Therefore, it is possible to insert the nozzle body head 23 into the inner spline portion while the guide portion 22 is guided by the hole portion. This makes the insertion work easy. As will be described later, also when grease is applied and in the case where the nozzle body 20 is drawn out from the workpiece after completion of the grease application, the nozzle body 20 is smoothly moved.

However, for some workpieces, there are cases where although the shapes of the inner spline portions are the same, the inner diameters of the hole portions on the proximal side are different. For example, suppose that the inner diameters of the hole portions of the workpieces have two types: d0 and d1 (where d1>d0). In this case, for workpieces having a hole portion with an inner diameter of d0, it is possible to use the guide portion 22 as an insertion guide.

On the other hand, in the case where grease is applied to workpieces having a hole portion with an inner diameter of d1, it is possible to do grease application work after attaching a collar 29 to the guide portion 22 as shown in FIG. 10.

The collar 29 is a cylindrical member in which an inner circumferential surface 29b has an inner diameter of D0 and in which an outer circumferential surface 29a has an outer diameter of D1. Here, the outer diameter D1 of the outer circumferential surface 29a has a dimension that allows the collar 29 to be slidably fitted into the hole portion d1 of the workpiece. In the case where the collar 29 is attached, the abutment plate 25 may be used as a member that positions the collar 29 in the axis direction by an end portion of the collar 29 being abutted thereon.

For the collar 29, various shapes may be previously prepared according to the shapes of the hole portions of the workpieces. As a result, even if the shape of the hole portion of the workpiece is different, a selection of an appropriate collar 29 makes a similar work available for each case. Therefore, insertion of the nozzle body head 23 and grease application work are smoothly performed.

Next, an operation of the grease application device 100 will be described, with an emphasis on the grease application method by use of the grease application device 100.

Figure 11:
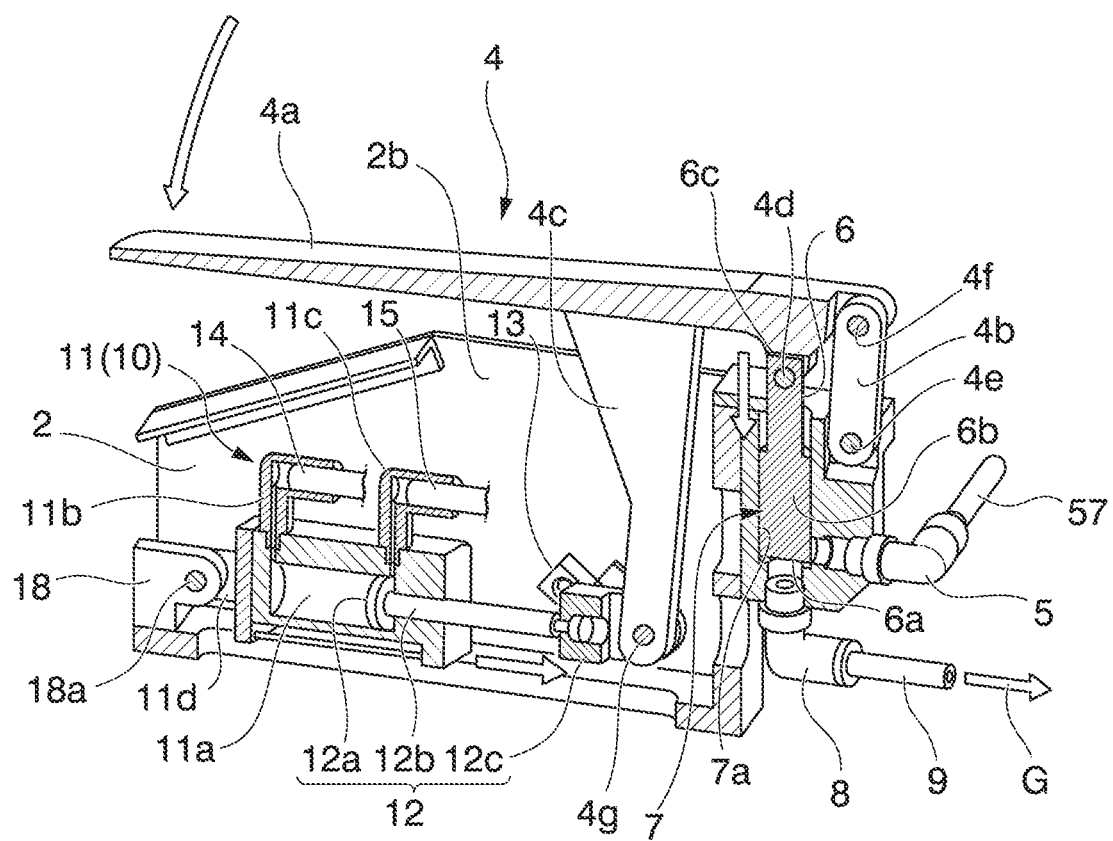
FIG. 11 is an operation explanation diagram for a nozzle body shift portion and a grease pressure-feed portion of the grease application device according to the first embodiment of the present invention.
Figure 12:
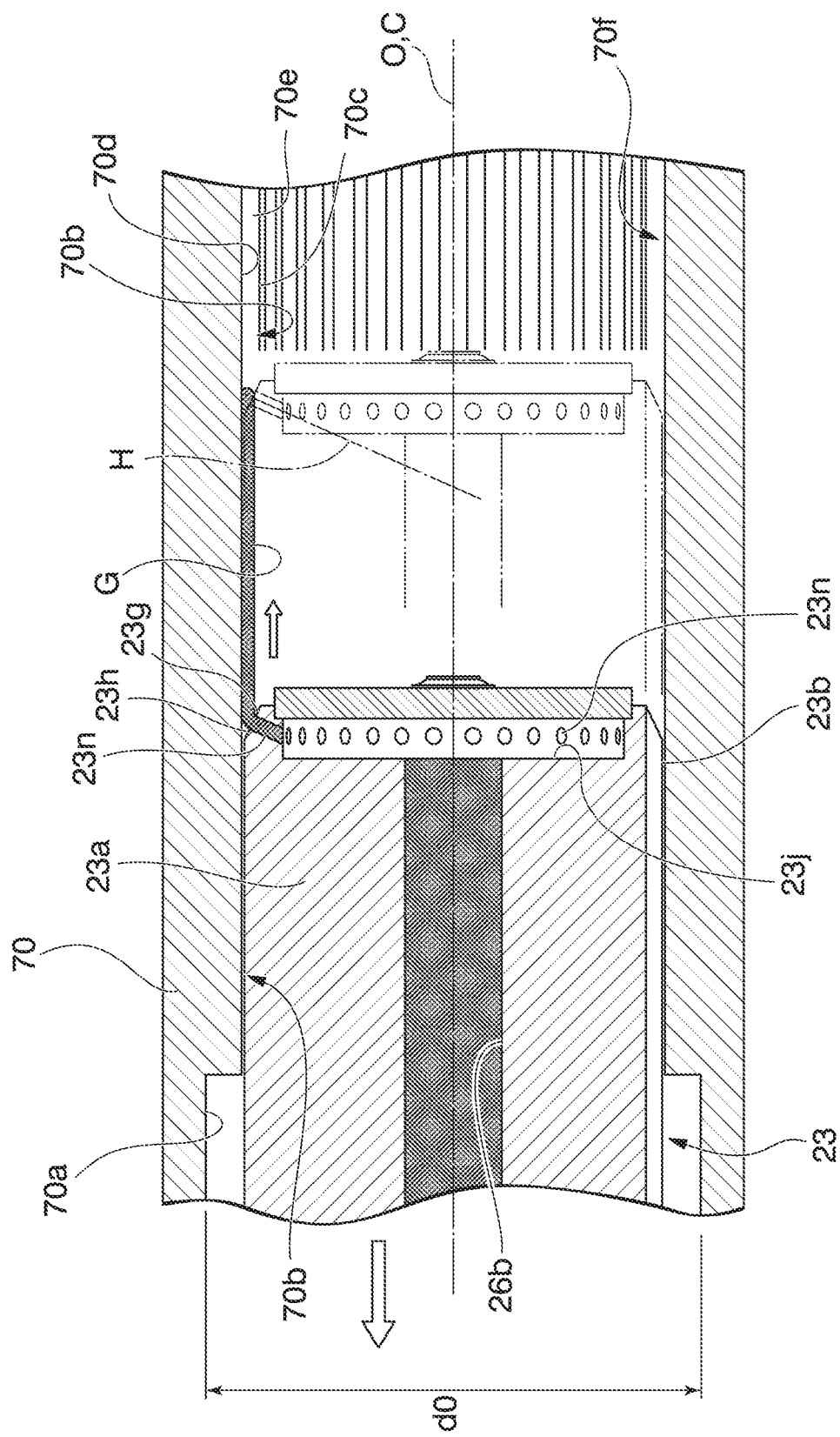
FIG. 12 is an operation explanation diagram for a grease application operation of the grease application device according to the first embodiment of the present invention.

FIG. 11 is an operation explanation diagram for the nozzle body shift portion and grease pressure-feed portion of the grease application device according to the first embodiment of the present invention. FIG. 12 is an operation explanation diagram for the grease application operation of the grease application device according to the first embodiment of the present invention.

Firstly, an operation of the grease gun 1 at the time of operation on the operation lever 4 will be described.

An operation on the operation lever 4 is performed by the operator himself or herself in a state with the operator holding the holder body 2 in place with the handle 3 or the like. In a state with the operator holding the holder body in place, the grease gun 1 is not mounted on the mount 50. Therefore, the mount state detection switch 54c detects a mount-release state. As a result, if the first shutoff valve 53a is open, the grease G is pressure-fed to the grease supply tube 57.

When the operator operates on the operation lever 4 in the range of movement, the operation lever 4 is allowed to be in a fully open state, a fully closed state, and a state between the fully open state and the fully closed state.

The fully open state is a state in which the lever main unit 4a is rotated to its limit in a direction away from the holder body 2, as shown in FIG. 3.

As will be described later, for example, before a grease application is performed, the operation lever 4 is normally in the fully open state.

The fully closed state is a state in which the lever main unit 4a is rotated to its limit in a direction closer to the holder body 2, as shown in FIG. 11. In the fully closed state, the lever main unit 4a is substantially parallel with the holder body 2 in the longitudinal direction. As will be described later, for example, in a state where a grease application is completed, the operation lever 4 is normally in the fully closed state. When the grease gun 1 is mounted onto the mount 50, it is preferably that the operation lever 4 be in the fully closed state. For example, in order to prevent the grease gun 1 from being mounted in the mount state unless the operation lever 4 is put in the fully closed state, an appropriate guide protrusion may be provided on the mount 50.

As shown in FIG. 3, when the operator switches the state of the operation lever 4 from the fully closed state to the fully open state, the operation lever 4 rotates about the rotational joint 4e. With this rotation, the rotational joint 4d is pulled up in the axis direction of the cylinder 7a. Consequently, the coupling portion 6c of the piston 6 is pulled up. At the same time, with this rotation, the arm 4c rotates about the rotational joint 4d. Consequently, while rotating in the same direction as the lever main unit 4a, the rotational joint 4g moves to the second end portion e2 side in the longitudinal direction of the holder body 2. Therefore, the first cylinder 11 coupled to the rotational joint 4g rotates about the rotational joint 18a in the reverse direction to the arm 4c. In a linked manner with this, the first piston 12 moves to the base end side of the first cylinder 11.

At this time, the coupling portion 12c is located outside a range of detection of the bare area prevention sensor 13.

When the piston 6 is pulled up, the grease G flows into the cylinder 7a from the grease supply tube 57. At this time, because the pipe 9 is coupled to the cylinder 7a via the second check valve 8, the grease G in the pipe 9 will not flow back to the cylinder 7a.

Accordingly, in the fully open state of the operation lever 4, a given amount of grease G is charged into the cylinder 7a via the grease supply tube 57.

When the first piston 12 moves to the base end side, then in the first cylinder chamber 11a, a fluid on the further base end side than the piston head 12a is pressurized. This fluid is pressed out from the first tube joint 11*b* into the coupling tube 14. At the same time, in the first cylinder chamber 11*a*, a liquid on the further front end side than the piston head 12*a* is depressurized. Therefore, a fluid is sucked from the coupling tube 15 through the second tube joint 11*c*.

As a result, as shown in FIG. 4, in the second cylinder chamber 16*a*, the fluid pressed out from the coupling tube 14 advances to the further base end side than the piston head 17*a*. The fluid on the further front end side than the piston head 17*a* moves to the first cylinder 11 side through the coupling tube 15. Thus, in a linked manner with the operation of the coupling tube 14, the piston head 17*a* moves to the front end side of the second cylinder chamber 16*a*.

When the piston head 17*a* moves to the front end side of the second cylinder chamber 16*a*, the shaft portion 17*b* of the second piston 17 pushes out the inner cylindrical portion 26B and the nozzle body head 23 from the second end portion E2 side to the first end portion E1 side. Therefore, in the fully open state of the operation lever 4, the whole length of the nozzle body 20 becomes maximum in a range of extension of the nozzle body 20.

As shown in FIG. 4, when the operator switches the state of the operation lever 4 from the fully open state to the fully closed state, the operation lever 4 moves in the direction opposite to that of the aforementioned motion.

In a linked manner with this, the piston 6 is pressed down. At this time, by the pressing pressure of the piston head 6*a*, the second check valve 8 is opened. Therefore, the grease G in the cylinder 7*a* is pressure-fed to the pipe 9. On the other hand, when an inner pressure in the cylinder 7*a* acts, the first check valve 5 remains closed. As a result, the grease G in the cylinder 7*a* is pressure-fed only to the pipe 9 without flowing back to the grease supply tube 57. When the state of the operation lever 4 is switched from the fully closed state to the fully open state, the grease which was sucked from the grease supply tube 57 to the cylinder 7*a*, when the operator switched the state of the operation lever 4 from the fully open state to the fully closed state, is all pressure-fed to the pipe 9. Therefore, when a single operation of switching the state of the operation lever 4 from the fully closed state to the fully open state and then back to the fully closed state is performed, a given amount of grease G is pressure-fed to the pipe 9.

On the other hand, when the operator switches the state of the operation lever 4 from the fully open state to the fully closed state, the first piston 12 also moves in the direction opposite to that of the aforementioned movement. In a linked manner to this, the second piston 17 moves from the first end portion E1 side to the second end portion E2 side. Therefore, the inner cylindrical portion 26B and the nozzle body head 23 also move from the first end portion E1 side to the second end portion E2 side. The nozzle body 20 comes to have the minimum length in the range of movement. The coupling portion 12*c* is located in the range of detection of the bare area prevention sensor 13.

Thus, when a single operation of returning the state of the operation lever 4 from the fully open state to the fully closed state is performed, the position of the nozzle body head 23 is moved from the first end portion E1 to the second end portion E2 side by a given distance. At the same time, the bare area prevention sensor 13 detects the movements of the coupling portion 12*c* coupled to the operation lever 4, and updates the count value of the number of movements.

Next, a grease application method by use of the grease application device 100 will be described.

By way of example, a case will be described where grease G is applied to an inner spline portion 70*b* of a workpiece 70 shown in FIG. 12.

The inner spline portion 70*b* is formed in a deep part of a hole portion 70*a* that is provided at an end portion (not shown in the figures) of the workpiece 70. The hole portion 70*a* has an inner diameter of d0. Therefore, without attachment of a collar, the guide portion 22 is allowed to be slidably fitted into the hole portion 70*a*.

The shape of the inner spline portion 70*b* is, for example, an involute spline that circumferentially engages the spline 23*b*. The inner spline portion 70*b* is provided with a plurality of tooth portions 70*e* with the same pitch as that of the tooth portions 23*e* of the spline 23*b*. Between the adjacent tooth portions 70*e*, there is formed a groove portion 70*f* that engages the tooth portion 23*e*.

An inner diameter of a large-diameter surface 70*d* of the inner spline portion 70*b* is not less than an outer diameter of a large-diameter surfaces 23*d* of the spline 23*b*. Similarly, an inner diameter of small-diameter surface 70*c* of the inner spline portion 70*b* is not less than an outer diameter of small-diameter surfaces 23*c* of the spline 23*b*.

To apply grease G to the inner spline portion 70*b* by use of the grease application device 100, the grease G is previously charged into a flow passage for the grease G in an interior of the grease gun 1 in a state with the first shutoff valve 53*a* being open. Namely, the grease supply tube 57, the pipe 9, the grease flow passage 26*b*, and the front recess portion 23*j* are previously charged with the grease G. Then, the operator mounts the grease gun 1 onto the first support portion 51 and the second support portion 52, with the operation lever 4 being in the fully closed state. In this mount state, the second shutoff valve 54 is closed, and hence, the grease G will not be pressure-fed to the grease gun 1 side.

Next, the operator takes up the grease gun 1 from the mount 50. While holding the handle 3 or the like, the operator sets the operation lever 4 in the fully open state. When the grease gun 1 is taken up, the mount state detection switch 54*c* detects the mount-release state. Therefore, the second shutoff valve 54 is opened. As a result, pressure-feeding of the grease G from the grease supply source becomes available.

When the operator keeps on opening the operation lever 4 until the operation lever 4 is in the fully open state, the grease G is supplied from the grease supply tube 57 to the cylinder 7*a* as a result of the piston 6 being pulled up. At the same time, the inner cylindrical portion 26B and nozzle body head 23 of the nozzle body 20 move to the first end portion E1 side.

Next, the operator holds the holder body 2, and moves the grease gun 1 to the vicinity of the workpiece 70. At this time, the grease gun 1 is capable of moving in the range of the length of the grease supply tube 57. Furthermore, because being hung by the hook 58, the grease supply tube 57 is allowed to be moved with ease. Furthermore, the grease supply tube 57 will not be dragged on the floor, and will not interfere with what is arranged on the floor.

After moving to the vicinity of the workpiece 70, the operator moves the holder body 2 forward, and inserts the nozzle body 20 of the grease gun 1 into the hole portion 70*a* of the workpiece 70 from the front end side. The nozzle body head 23 is inserted into the interior further than the hole portion 70*a*. At this time, into the hole portion 70*a*, the guide portion 22 is being inserted. Therefore, the central axis line O of the nozzle body 20 is coaxial with a central axis line C of the hole portion 70*a* and of the inner spline portion 70*b*.

When the nozzle body head 23 reaches the inner spline portion 70b, the operator moves the nozzle body head 23 forward while rotating it in the circumferential direction, to thereby find a position at which the spline 23b engages the inner spline portion 70b. When an arrangement in which the engagement is available is determined, the operator moves further forward the holder body 2 he or she holds, to thereby insert the nozzle body head 23 into the interior of the inner spline portion 70b.

The insertion position of the nozzle body head 23 is adjusted by the operator to a position that is deepest in the range of grease application in the inner spline portion 70b. This is because the position of the nozzle 23n at the time of insertion is an application start position of the grease G by the grease application device 100.

A proper insertion position of the nozzle body head 23 may be determined by, for example, setting a distance between the end portion of the workpiece 70 and the abutment plate 25 to a predetermined value according to the shape of the workpiece 70. For example, the abutment plate 25 may be provided so that when the abutment plate 25 is brought into abutment with the end portion of the workpiece 70, the nozzle body head 23 is brought to a proper insertion position.

Next, while holding the holder body 2 in place at the time of insertion, the operator closes the operation lever 4 until the operation lever 4 is in the fully closed state.

As a result, as shown in FIG. 12, the nozzle body head 23 moves backward toward the hole portion 70a, and at the same time, the grease G is discharged from the nozzles 23n. Namely, by the pressure of the grease G that has been pushed out from the cylinder 7a into the pipe 9 through the second check valve 8, the grease G on the further front end side is being pressure-fed. Therefore, the grease G of the pipe 9 flows into the grease flow passage 26b from the grease injection portion 24. Furthermore, the grease G in the front recess portion 23j and each nozzle 23n is pressurized. As a result, the grease G in the front recess portion 23j and each nozzle 23n is discharged to the outside from each nozzle opening portion 23h. Note that in FIG. 12, illustration of the grease G in the front recess portion 23j is omitted for easiness of visual recognition.

The grease G discharged from the nozzle opening portions 23h is applied to the insides of the groove portions 70f. However, because the nozzle body head 23 moves backward to an end portion side of the workpiece 70 (to the left side as shown in FIG. 12), the grease G moves, in the groove portions 70f, to the end portion side of the workpiece 70, and is applied in linear shapes.

At this time, the nozzle opening portions 23h are opened in the inclined surface 23g. Toward the front end side, the inclined surface 23g is inclined in the direction radially internally away from the large-diameter surface 70d of the inner spline portion 70b. Namely, the nozzle opening portion 23h is inclined so that the space expands gradually in the discharge direction of the grease and hence, the pressure of the grease G is lessened. Therefore, the grease G is inhibited from splattering due to discharge pressure or because grease G has nowhere to escape in the discharge target area.

Furthermore, relatively to the discharged grease the inclined surface 23g moves in the direction opposite to the discharge direction. Therefore, it is possible for the grease G to move smoothly along the inclined surface 23g.

Thus, according to the grease application device 100, splatter or deformation of the grease G will not be produced at the time of application of the grease G. This eliminates the necessity of wiping off grease from the inner spline portion 70b or the nozzle. Therefore, by use of the grease application device 100, a swift grease application is made available.

In the case of using the grease application device 100, the grease G is smoothly applied through the operation of closing the operation lever 4. The amount of discharge of the grease G and the amount of movement of the nozzle body head 23 as well as the amount of operation on the operation lever 4 are linked on one-on-one basis. Therefore, even if the operation speed of the operator changes, the grease G is applied in a linear shape in which its amount per application length is constant. The grease G is uniformly applied to the insides of the groove portions 70f of the workpiece 70 in the longitudinal direction.

If the nozzles 23n have the same shape, then the discharge pressure and discharge mount of the grease G are the same for each nozzle 23n. Therefore, the application amount is uniform among the groove portions 70f.

When the operator closes the operation lever 4 as far as to the fully closed state, an application of a given amount of grease G is completed. The bare area prevention sensor 13 detects that the number executions of grease applications has increased by one.

The operator pulls out the holder body 2 from the workpiece 70. At this time, at the front end of the nozzle body head 23, the grease G is in contact via the inclined surface 23g. Therefore, at the time of pulling out, the grease G is ready to be cut off along the inclined surface 23g. At the time of pulling out, the nozzle body head 23 does not rub against the applied grease G. This prevents deformation of the grease G after application as well.

Thus, according to the grease application device 100, splatter or deformation of the grease G is not produced at the time of pulling out the nozzle body 20. This eliminates the necessity of wiping off grease from the inner spline portion 70b or the nozzle. Therefore, by use of the grease application device 100, a swift grease application is made available.

In the case where workpieces 70 have inner spline portions that need grease application, the operator does the similar grease application work as described above onto other inner spline portions as well.

On completion of the grease application to all the inner spline portions of the workpiece 70 that need grease application, similar grease application work is done onto the subsequent workpiece 70.

If the operator forgets to apply grease to areas that need grease application in the workpiece 70, then the number of executions of grease applications that is detected by the bare area prevention sensor 13 is less than a predetermined value. In this case, because provided with the bare area prevention sensor 13, the grease application device 100 is capable of performing control for preventing bare areas. For example, the grease application device 100 is capable of stopping the work transfer device 200 and of causing the display portion 201 to display a warning message or the like.

When the number of executions of grease applications reaches a predetermined value and the bare area prevention sensor 13 sends out a control signal for preventing bare areas, then the bare area prevention sensor 13 resets the count value.

As has been described above, according to the grease application device 100, with a simple operation of inserting the nozzle body into the workpiece inner spline portion and operating the operation portion, it is possible to apply a given amount of grease to a specific location that is determined by an arrangement of the nozzle.

Therefore, according to the grease application device and grease application method of the present embodiment, it is possible to apply easily and securely a given amount of grease in the grooves of the inner spline portion.

Second Embodiment

A grease application device according to a second embodiment of the present invention will be described.

Figure 13:
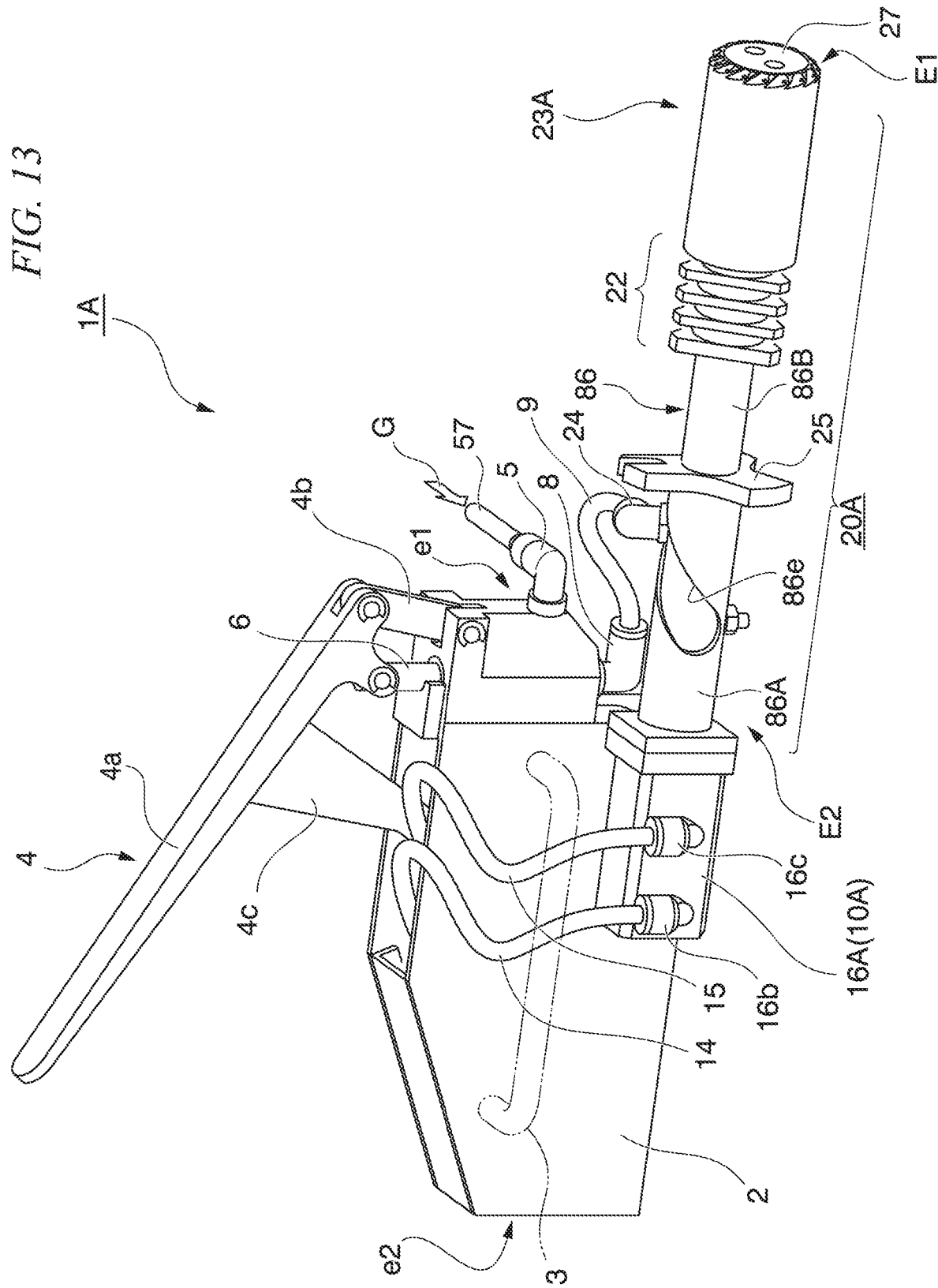
FIG. 13 is a schematic perspective view showing a structure of a main part of a grease application device according to a second embodiment of the present invention.
Figure 14:
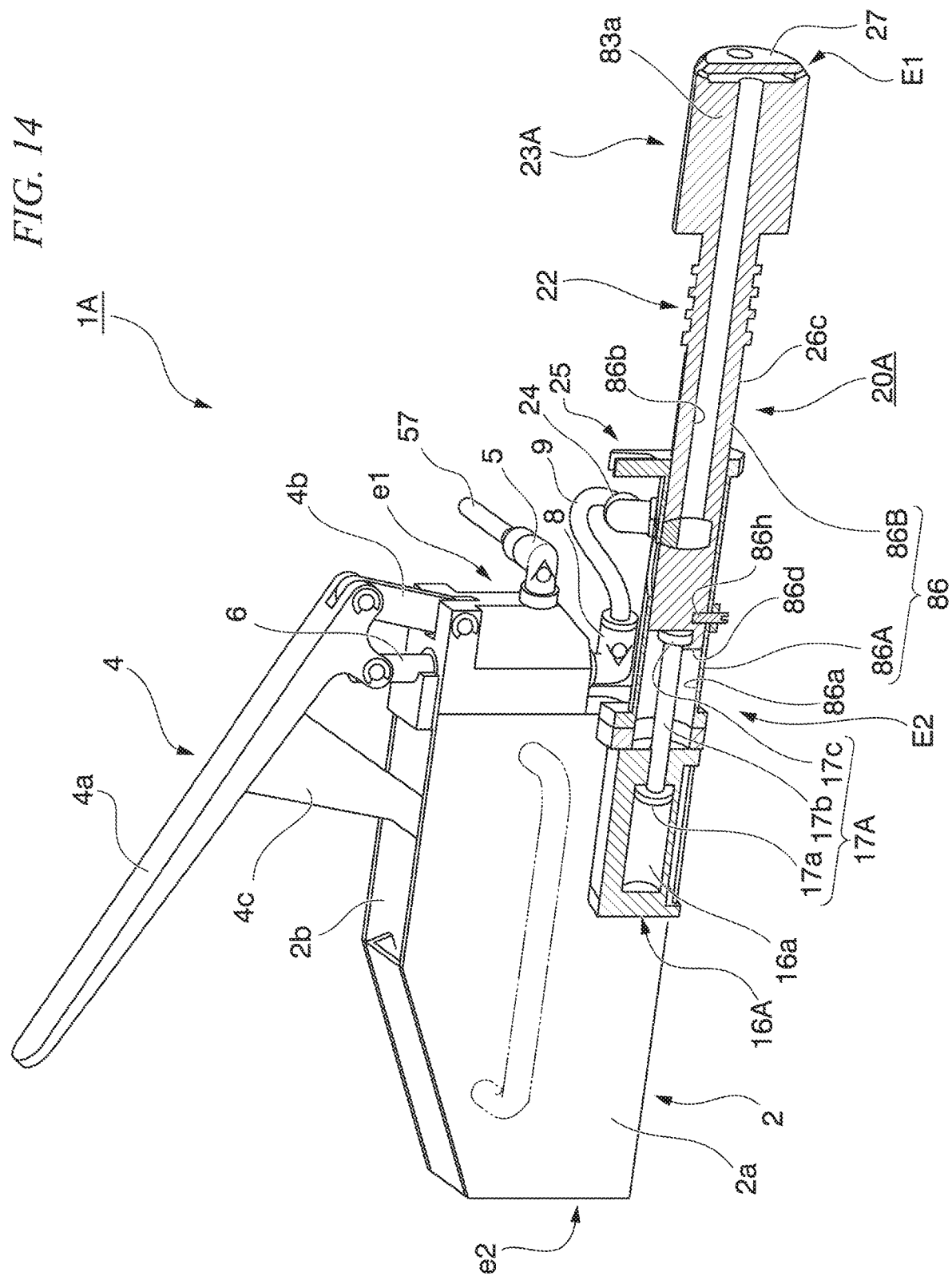
FIG. 14 a partial cross-sectional view of a schematic perspective showing an internal structure of a nozzle body of the grease application device according to the second embodiment of the present invention.
Figure 15:
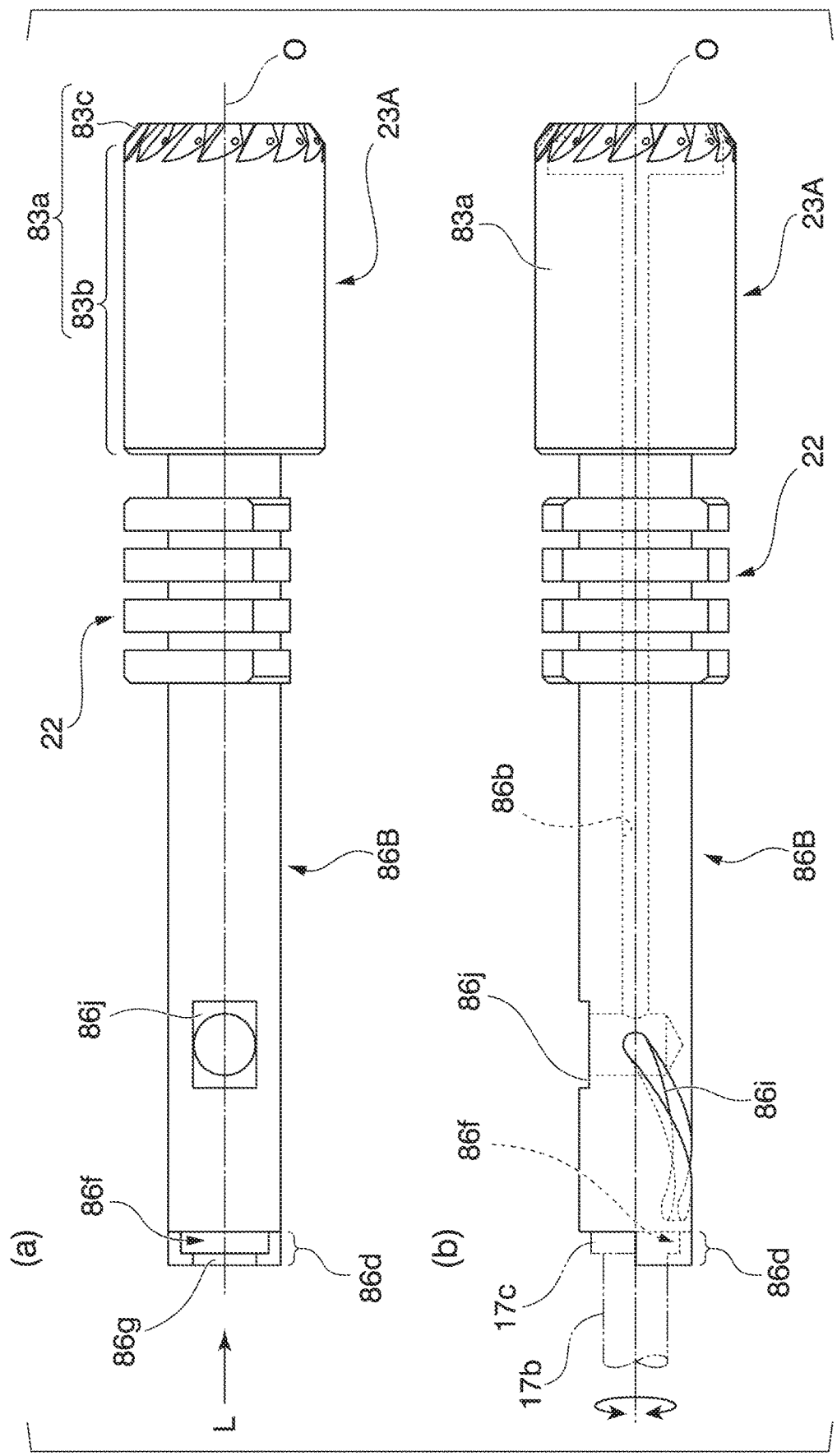
FIG. 15 is a schematic plan view and a front view of the nozzle body of the grease application device according to the second embodiment of the present invention.
Figure 16:
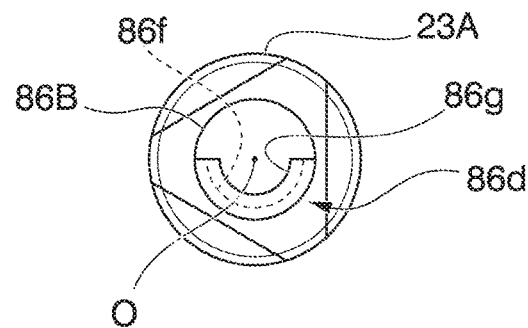
FIG. 16 is a view of FIG. 15 when seen in the direction of L.
Figure 17:
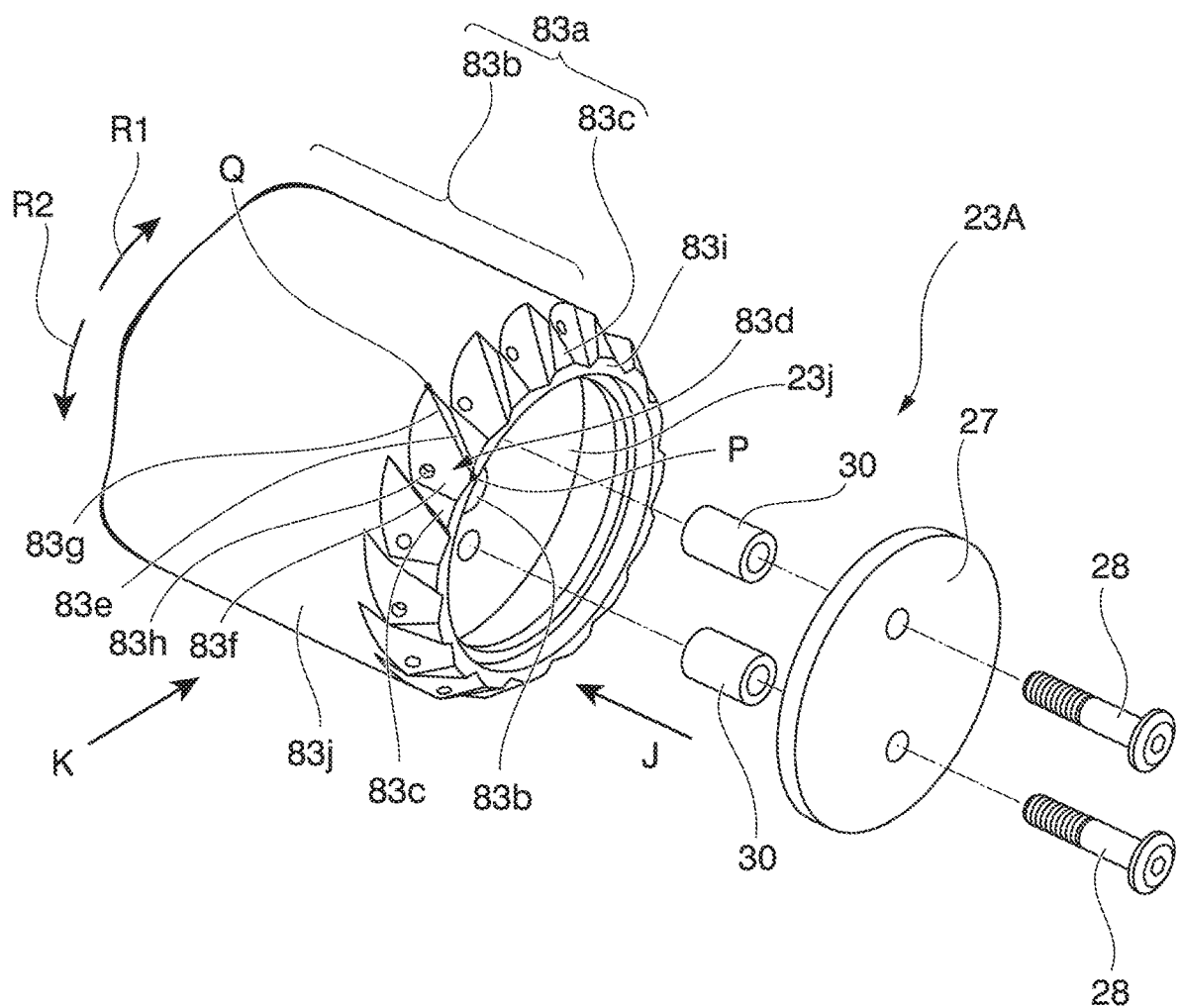
FIG. 17 is a schematic perspective view showing a first end portion of the nozzle body of the grease application device according to the second embodiment of the present invention.
Figure 18:
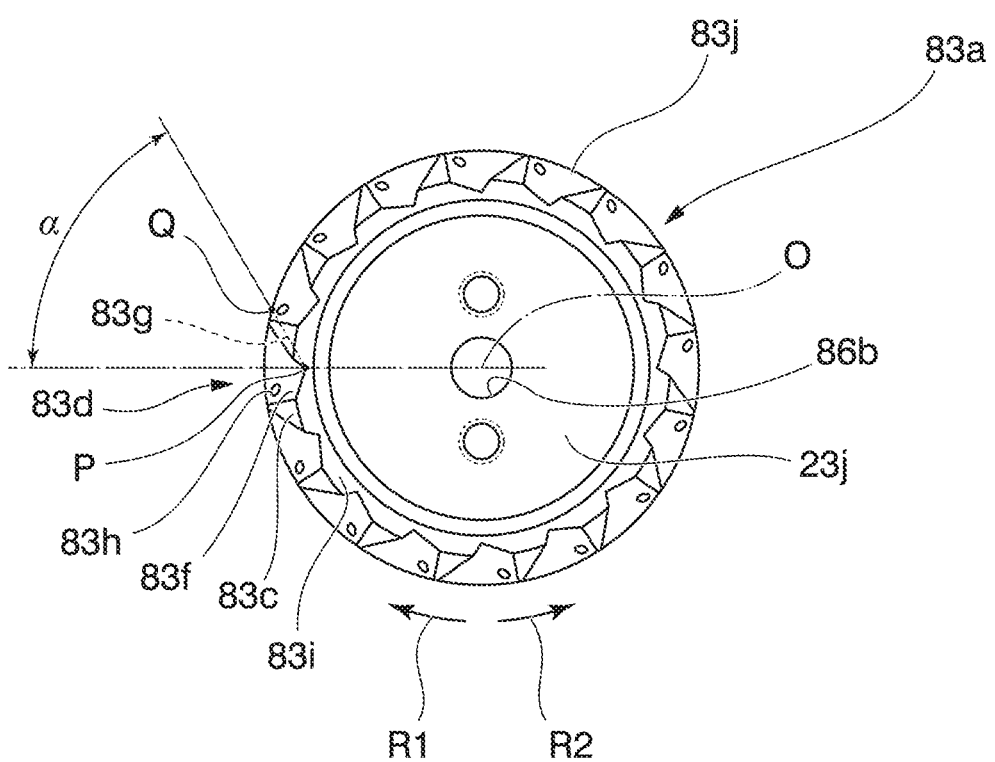
FIG. 18 is a view of FIG. 17 when seen in the direction of J.
Figure 19:
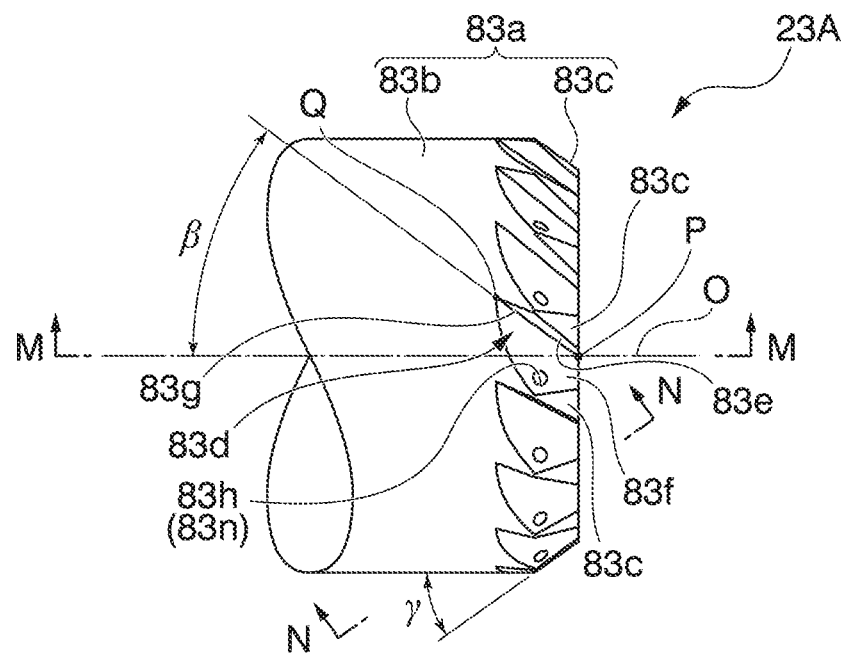
FIG. 19 is a view of FIG. 17 when seen in the direction of K.
Figure 20:
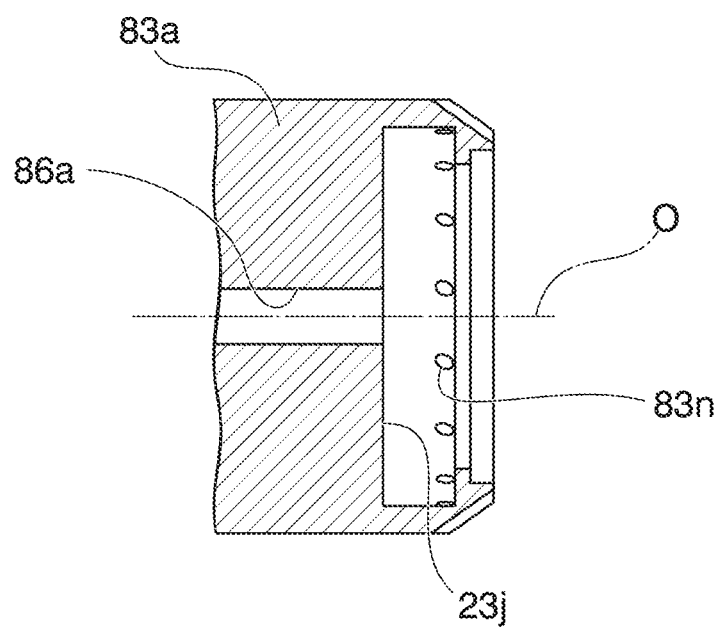
FIG. 20 is a cross-sectional view of FIG. 19, taken along M-M.
Figure 21:
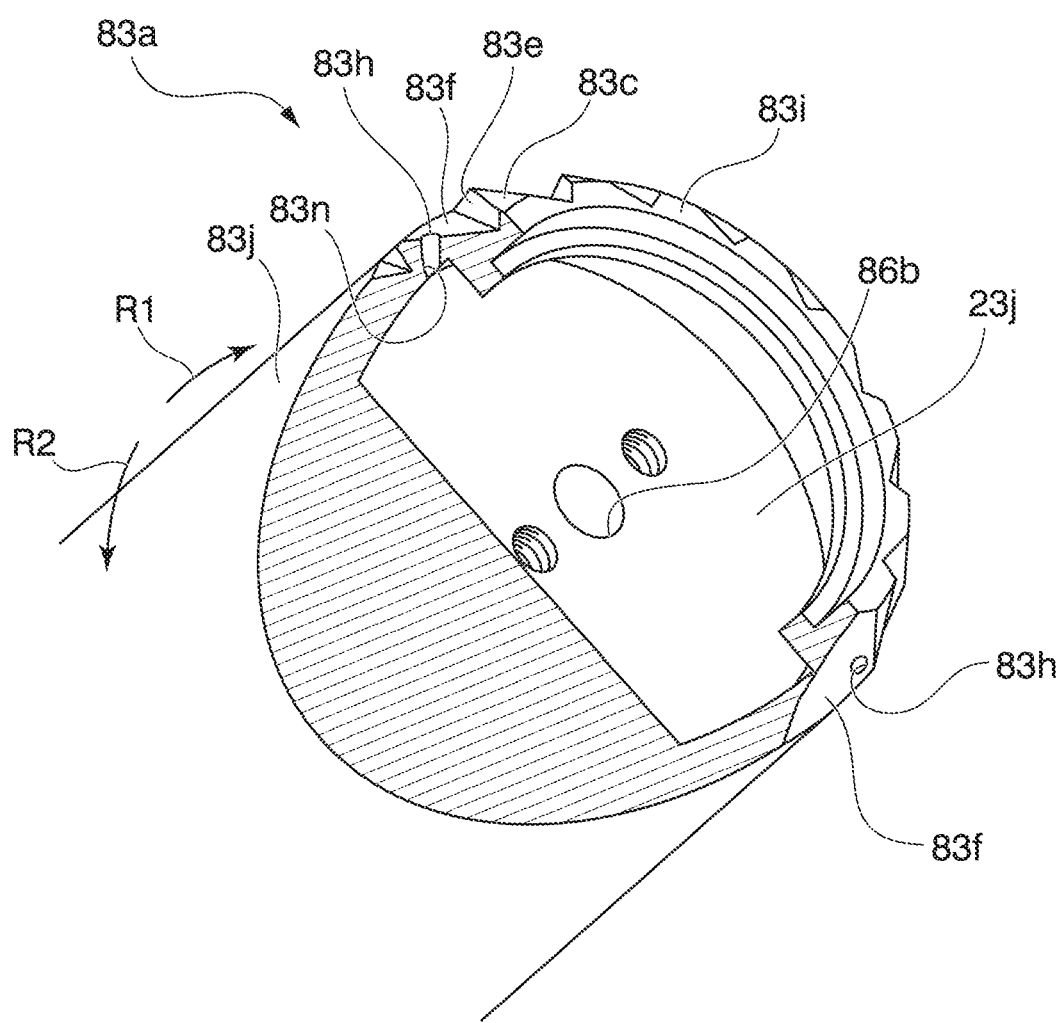
FIG. 21 is a cross-sectional view of FIG. 19, taken along N-N.

FIG. 13 is a schematic perspective view showing a structure of the main part of the grease application device according to the second embodiment of the present invention. FIG. 14 is a partial cross-sectional view of a schematic perspective showing an internal structure of a nozzle body of the grease application device according to the second embodiment of the present invention. FIG. 15 is schematic diagrams of the nozzle body of the grease application device according to the second embodiment of the present invention. In FIG. 15, FIG. 15(*a*) is a plan view, and FIG. 15(*b*) is a front view. FIG. 16 is a view of FIG. 15 when seen in the direction of L. FIG. 17 is a schematic perspective view showing a first end portion of the nozzle body of the grease application device according to the second embodiment of the present invention. FIG. 18 is a view of FIG. 17 when seen in the direction of J. FIG. 19 is a view of FIG. 17 when seen in the direction of K. FIG. 20 is a cross-sectional view of FIG. 19, taken along M-M. FIG. 21 is a cross-sectional view of FIG. 19, taken along N-N.

The grease application device according to the present embodiment includes a grease gun 1A shown in FIG. 13, instead of the grease gun 1 of the grease application device 100 according to the aforementioned first embodiment. Similarly to the grease application device 100 according to the aforementioned first embodiment, the grease application device according to the present embodiment is a device that applies grease G to an interior of an inner spline portion that is formed at an end portion of a workpiece made of various mechanical parts.

Hereinafter is a description with an emphasis on different points from the aforementioned first embodiment.

The grease gun 1A is a handgun-type device similar to the grease gun 1 according to the aforementioned first embodiment. The grease gun 1A includes a second cylinder 16A and a nozzle body 20A instead of the second cylinder 16 and the nozzle body 20 of the grease gun 1.

The second cylinder 16A is different from the second cylinder 16 according to the aforementioned first embodiment in that the first tube joint 16*b* and the second tube joint 16*c* are arranged at different positions from the case of the second cylinder 16 of the aforementioned first embodiment. To be more specific, in the second cylinder 16A, the first tube joint 16*b* and the second tube joint 16*c* are arranged in a side surface opposite to the side surface on which the second cylinder 16A is fixed to the holder body 2.

Furthermore, as shown in FIG. 14, the second cylinder 16A is different from the second cylinder 16 according to the aforementioned first embodiment in including a second piston 17A instead of the second piston 17 of the second cylinder 16 of the aforementioned first embodiment.

The second piston 17A is different from the second piston 17 in including an engagement portion 17*c* at the front end of the shaft portion 17*b* of the second piston 17.

The engagement portion 17*c* is coupled to a coupling portion 86*d* at a base end of an inner cylindrical portion 86B of the nozzle body 20A (described later) so as to be rotatable about the central axis line of the shaft portion 17*b*.

Together with the first cylinder 11 (not shown in FIG. 13 and FIG. 14) in an interior of the holder body 2, the second cylinder 16A forms a nozzle body shift portion 10A.

As described above, the second cylinder 16A is different from the second cylinder 16 only in the arrangement positions of the first tube joint 16*b* and the second tube joint 16*c* and in the structure of the coupling portion at the front end of the second piston 17A. The nozzle body shift portion 10A is a power transmission mechanism that converts a rotational movement of the operation lever 4 to a linear movement and transmits it to the nozzle body 20A in the same manner as the nozzle body shift portion 10 of the aforementioned first embodiment.

As shown in FIG. 13 and FIG. 14, the nozzle body 20A includes a shaft portion 86 and a nozzle body head 23A, instead of the shaft portion 26 and the nozzle body head 23 of the nozzle body 20 of the aforementioned first embodiment. In a portion of the shaft portion 86 that is adjacent to the nozzle body head 23A, there is formed a guide portion 22 similar to that of the aforementioned first embodiment.

The nozzle body head 23A and the shaft portion 86 are cylindrical members whose central axis lines are coaxial. Hereinafter, these central axis lines are referred to as central axis line O.

The shaft portion 86 includes: an outer cylindrical portion 86A; and an inner cylindrical portion 86B.

The outer cylindrical portion 86A includes an opening portion 86*e* (see FIG. 13) instead of the opening portion 26*e* of the outer cylindrical portion 26A of the aforementioned first embodiment, and is formed with an addition of a guide pin 86*h* (see FIG. 14). At a front end of the outer cylindrical portion 86A, there is formed an abutment plate 25, similarly to the case of the aforementioned first embodiment.

The outer cylindrical portion 86A is arranged at a second end portion E2 of the nozzle body 20A. The outer cylindrical portion 86A is fixed to a front end portion of the second cylinder 16A.

An inner circumferential surface 86*a* of the outer cylindrical portion 86A allows the inner cylindrical portion 86B (described later) to be fitted thereinto so as to be slidable along the central axis line O of the inner circumferential surface 86*a* and so as to be rotatable about the central axis line O. An inner diameter of the inner circumferential surface 86*a* is larger than outer diameters of the shaft portion 17*b* and engagement portion 17*c* of the second piston 17A.

As shown in FIG. 13, the opening portion 86*e* is a spiral opening portion that is provided so as to penetrate through a side surface of the outer cylindrical portion 86A. The opening portion 86*e* allows a grease injection portion 24, which is provided on the inner cylindrical portion 86B (described later) in a similar manner in the case of the aforementioned first embodiment, to penetrate therethrough. An opening shape of the opening portion 86*e* is formed in a spiral that allows the grease injection portion 24 to penetrate therethrough in all the locations along which the grease injection portion 24 moves in the range of movement of the inner cylindrical portion 86B (described later).

As shown in FIG. 14, the guide pin 86*h* protrudes inwardly at a predetermined location of the inner circumferential surface 86*a*. The guide pin 86*h* is slidably fitted into a rotation guide groove 86*i* (see FIG. 15) of the inner cylindrical portion 86B (described later).

The inner cylindrical portion 86B is a cylindrical member that has an outer diameter substantially the same as an inner diameter of the inner circumferential surface 86*a* and that is slidably inserted into the inner circumferential surface 86*a* of the outer cylindrical portion 86A. A front end side of the inner cylindrical portion 86B is protruded further than the outer cylindrical portion 86A.

In an interior of the inner cylindrical portion 86B, there is formed a grease flow passage 86b that extends in the longitudinal direction of the inner cylindrical portion 86B and allows the grease G to flow therethrough. The grease flow passage 86b is closed on a base end side of the inner cylindrical portion 86B. On the front end side of the inner cylindrical portion 86B, the grease flow passage 86b penetrates through the nozzle body head 23A (described later).

On a side surface of the inner cylindrical portion 86B on the base end side, in a region that overlaps the opening portion 86e of the outer cylindrical portion 86A, there is provided a grease injection portion 24. The grease injection portion 24 penetrates through an outer circumferential surface of the inner cylindrical portion 86B to be in communication with the grease flow passage 26b. In the present embodiment, the grease injection portion 24 protrudes from the opening portion 86e to the outside. To the grease injection portion 24, there is connected an end portion of the pipe 9 via a pipe joint. Similarly to the aforementioned first embodiment, between the second check valve 8 and the grease injection portion 24, there is formed a flow passage of grease for which the pipe 9 is used.

As shown in FIG. 15(b), the inner cylindrical portion 86B includes on the base end side: a coupling portion 86d; a rotation guide groove 86i; and an attachment portion 86j. At the front end of the inner cylindrical portion 86B, there is arranged a nozzle body head 23A.

The coupling portion 86d includes: an engagement groove 86f; and a bearing portion 86g, as shown in FIG. 15(b).

As shown in FIG. 15 and FIG. 16, the engagement groove 86f is a groove portion with a semicircular cross-section that is formed in an interior of a protrusion portion, which is a semicircular cross-section that is extended from the base end of the inner cylindrical portion 86B. A circle diameter of a groove bottom portion of the engagement groove 86f is substantially the same as an outer diameter of the engagement portion 17c of the second piston 17.

The bearing portion 86g is made of a semicircular notch that penetrates through an interior of the engagement groove 86f along the central axis line O of the inner cylindrical portion 86B. The semicircular portion of the bearing portion 86g is coaxial with the semicircular groove bottom of the engagement groove 86f An inner diameter of the bearing portion 86g is substantially the same as an outer diameter of the shaft portion 17b of the second piston 17.

With this structure, as shown in FIG. 15(b), with the engagement groove 86f of the coupling portion 86d, the engagement portion 17c and the shaft portion 17b are engaged so as to be rotatable respectively in the engagement groove 86f and the bearing portion 86g about the central axis line O of the shaft portion 17b and the inner cylindrical portion 86B. As a result of the engagement portion 17c engaging the engagement groove 86f, the second piston 17 and the inner cylindrical portion 86B are coupled to each other along their central axis line O.

The rotation guide groove 86i is a spiral groove along which the guide pin 86h is allowed to slide along the groove shape. The rotation guide groove 86i is formed from a surface of the inner cylindrical portion 86B toward an internal side thereof. The spiraling direction of the rotation guide groove 86i is a direction rotating counterclockwise about the central axis line O as it goes from the front end side to the base end side when the base end side is seen from the front end side along the central axis line O.

The angle of turn of the rotation guide groove 86i about the central axis line O and the length of the rotation guide groove 86i in the direction along the central axis line O may be appropriately determined according to the required application length of grease G. For example, the angle of turn may be not less than 45° and not more than 65°.

In the present embodiment, the angle of turn is 60°, by way of example. An exemplary length of the rotation guide groove 86i in the direction about the central axis line O may be a length over 25 mm so that a moving stroke of the nozzle body head 23A at the time of application of the grease G with a length of, for example, 25 mm is secured.

The attachment portion 86j is a recessed hole portion that fixes a grease injection portion 24, which is not shown in FIG. 15. As shown in FIG. 15(b), a hole portion of the attachment portion 86j is in communication with the grease flow passage 86b.

As shown in FIG. 13 and FIG. 14, the nozzle body head 23A forms a first end portion E1 of the nozzle body 20A. The nozzle body head 23A is a shaft body insertable into an inside of an inner spline portion that is formed on an end portion of a workpiece onto which a grease application is executed (hereinafter, referred to as workpiece inner spline portion).

The nozzle body head 23A includes a nozzle body main unit 83a that is formed at or connected to a front end of the inner cylindrical portion 86B, instead of the nozzle body main unit 23a of the nozzle body head 23 of the aforementioned first embodiment.

As shown in FIG. 17, at a front end portion of the nozzle body main unit 83a, there is formed a front recess portion 23j similarly to the case of the aforementioned first embodiment. However, at the center portion of the front recess portion 23j, the grease flow passage 86b opens that is extended from the inner cylindrical portion 86B (see FIG. 20). The opening of the front recess portion 23j on the front end side is sealed by a lid member 27 similar to that of the case of the aforementioned first embodiment.

The lid member 27 is fixed to the nozzle body main unit 83a with screws 28 via pipe-like spacers 30 that are arranged between the lid member 27 and the bottom surface of the front recess portion 23j.

As shown in FIG. 15(a), the nozzle body main unit 83a includes: a circular pillar portion 83b; and a chamfer portion 83c.

The circular pillar portion 83b is a portion that is inserted inner than the innermost circumferential portion of the workpiece inner spline portion. In the circular pillar portion 83b, an outer circumferential surface 83j, which is a cylindrical surface about the central axis line O, is formed on the outer circumferential portion. An outer diameter of the outer circumferential surface 83j is smaller than an inner diameter of an innermost circumferential portion of the workpiece inner spline portion. In the case where, for example, the innermost diameter of the workpiece inner spline portion is 30.0 mm, the outer diameter of the outer circumferential surface 83j may be 29.8 mm, by way of example.

As shown in FIG. 17, the chamfer portion 83c is formed over the whole circumference of the outer circumferential portion at the front end of the circular pillar portion 83b. As shown in FIG. 19, an inclination angle of the chamfer portion 83c with respect to the central axis line O is designated with γ. The inclination angle γ may be, for example, not less than 33° and not more than 37°. The inclination angle γ shown in FIG. 19 is 35°, by way of example.

As shown in FIG. 17, in the chamfer portion 83c, there transverse a plurality of groove portions 83d whose cross-section is V-shaped. The chamfer portion 83c is divided in the circumferential direction by the groove portions 83d.

The groove portions 83d are formed at regular intervals in the circumferential direction. The groove portions 83d are arranged so as to be rotationally symmetric with respect to the central axis line O.

Each groove portion 83d has, as groove surfaces, a first groove surface 83e and a second groove surface 83f (a groove surface that is inclined in a second rotation direction). When seen in a direction along the central axis line O (an axis direction of the first end portion), a valley line 83g along which the first groove surface 83e and the second groove surface 83f meet is inclined in a first rotation direction R1 about the central axis line O from the center side of the nozzle body head 23A to the outer circumferential side thereof. Therefore, similarly to the valley line 83g, the groove portion 83d, which extends along the valley line 83g, extends in the direction that is inclined in the first rotation direction R1. Hereinafter, a point at which the valley line 83g meets a front end surface 83i is designated with point P, and a point at which the valley line 83g meets the outer circumferential surface 83j is designated with point Q.

As shown in FIG. 18, the first rotation direction R1 of the present embodiment is a clockwise rotation direction about the central axis line O when the nozzle body main unit 83a is seen from the front end side toward the base end side. Similarly, a counterclockwise rotation direction about the central axis line O is hereinafter referred to as second rotation direction R2.

An inclination angle of the valley line 83g with respect to a radial line passing through the central axis line O and the point P when seen in the direction along the central axis line O (line segment PQ) is α when measured in the first rotation direction R1 from a straight line OP. The inclination angle α may be, for example, not less than 58° and not more than 61°. The inclination angle α shown in FIG. 18 is 59.9°, by way of example.

As shown in FIG. 19, an inclination angle of the valley line 83g with respect to the central axis line O when seen in the radial direction passing through the point P (line segment PQ) is β when measured from the central axis line O on the base end side. The inclination angle β may be, for example, not less than 35° and not more than 36°. The inclination angle β shown in FIG. 19 is 35.5°, by way of example.

As shown in FIG. 17, the first groove surface 83e of the groove portion 83d is inclined in the first rotation direction R1 from the valley line 83g. The second groove surface 83f of the groove portion 83d is inclined in the second rotation direction R2 from the valley line 83g.

Within a plane orthogonal to the valley line 83g, an angle δ (not shown in the figure) formed between the first groove surface 83e and the second groove surface 83f may be, for example, not less than 91.1° and not more than 92.1°. The inclination angle δ is 91.1°, by way of example.

As shown in FIG. 20, from the inner circumferential surface of the front recess portion 23j toward each second groove surface 83f, there is penetrated a nozzle 83n that is directed radially outwardly. As shown in FIG. 18, in each second groove surface 83f, there is formed a nozzle opening portion 83h, which is an end portion opening of the nozzle 83n.

As a cross-section of the nozzle 83n along the center is shown in FIG. 21, the nozzle 83n extends in an oblique direction that is inclined in the first rotation direction R1 from an interior of the nozzle body main unit 83a toward an outer circumferential portion and also toward a front end portion thereof. The nozzle 83n may cross the second groove surface 83f at an appropriate angle, but it is more preferable that it cross the second groove surface 83f in a range of not less than 35° and not more than 37°. In this angle range, the grease G discharged from the nozzle opening portion 83h becomes unlikely to be attached to the second groove surface 83f.

Next, an operation of the grease application device according to the present embodiment will be described, with an emphasis on different points from the grease application device 100 according to the aforementioned first embodiment.

Figure 22:
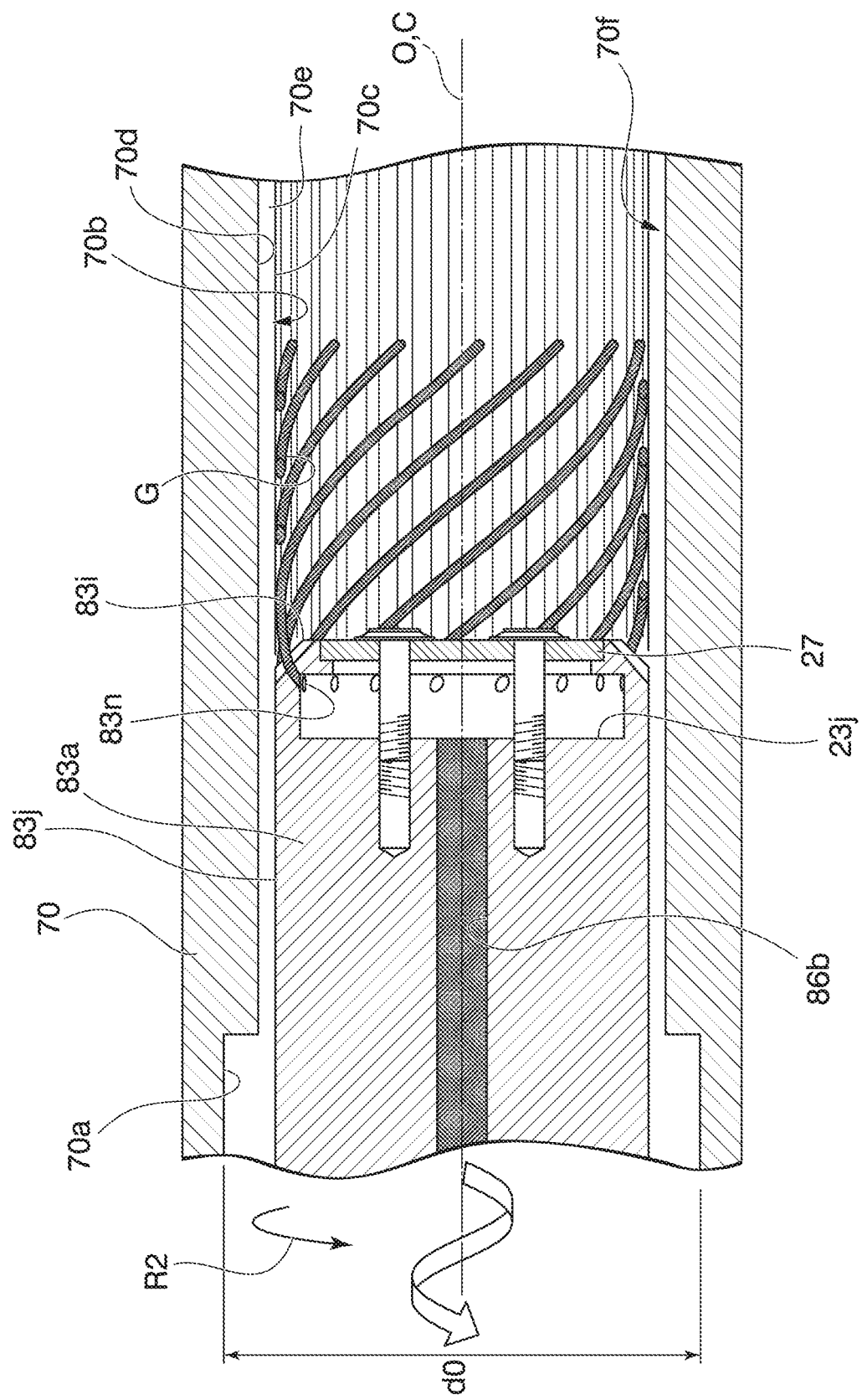
FIG. 22 is an operation explanation diagram for a grease application operation of the grease application device according to the second embodiment of the present invention.

FIG. 22 is an operation explanation diagram for a grease application operation of the grease application device according to the second embodiment of the present invention.

When the operation lever 4 is operated, the grease gun 1 of the aforementioned first embodiment and the grease gun 1A of the present embodiment operate similarly in that the grease G is supplied by the piston 6.

Furthermore, the nozzle body shift portion 10 of the grease gun 1 of the aforementioned first embodiment and the nozzle body shift portion 10A of the grease gun 1A of the present embodiment are similar power transmission mechanisms that convert a rotational movement of the operation lever 4 to a linear movement and that transmits it to the nozzle bodies 20, 20A, respectively. Therefore, when the operation lever 4 is operated, the second piston 17 of the aforementioned first embodiment and the second piston 17A of the present embodiment operate in a similarly manner.

However, in the present embodiment, the second piston 17A is coupled to the shaft portion 86 via the engagement portion 17c so as to be rotatable about the central axis line O. Furthermore, in the shaft portion 86, the guide pin 86h engages the rotation guide groove 86i of the inner cylindrical portion 86B.

Therefore, the relative movement, of the inner cylindrical portion 86B with respect to the outer cylindrical portion 86A, that is produced with the operation of the second piston 17A is restricted to a spiral movement along the rotation guide groove 86i.

As a result, in the grease gun 1A, as the operator is closing the operation lever 4 from the fully open state of the operation lever 4 as shown in FIG. 13, the nozzle body head 23A and the outer cylindrical portion 86A move from the front end side to the base end side along the central axis line O while rotating in the second rotation direction R2.

At this time, similarly to the aforementioned first embodiment, the grease G is discharged from each nozzle opening portion 83h. However, the directions of discharge of the grease G are different according to the directions of formation of the nozzles 83n.

Reversely, in the grease gun 1A, as the operator is opening the operation lever 4 from the fully closed state of the operation lever 4, the nozzle body head 23A and the outer cylindrical portion 86A move from the base end side to the front end side along the central axis line O while rotating in the first rotation direction R1.

At this time, similarly to the aforementioned first embodiment, the grease G is introduced from the grease supply tube 57 to the grease retention portion 7.

With reference to FIG. 22, a specific grease application operation by the grease gun 1A will be described.

Similarly to the aforementioned first embodiment, description will be for the case where the grease G is applied to the inner spline portion 70b of the workpiece 70.

For applying the grease G to the inner spline portion 70b by use of the grease application device of the present embodiment, the following is the same as the case of the aforementioned first embodiment: that after taking up the grease gun 1A from the mount 50, the operator switches the state of the operation lever 4 to the fully open state while holding the handle 3 or the like; that the operator inserts the nozzle body 20A of the grease gun 1A into the hole portion 70a of the workpiece 70 from the front end side; and that, through the workings of the guide portion 22, the central axis line O of the nozzle body 20A is inserted coaxially with the central axis line C of the hole portion 70a and the inner spline portion 70b.

In the present embodiment, the outer diameter of the nozzle body head 23A is smaller than the innermost diameter of the inner spline portion 70b. As a result, when the nozzle body head 23A reaches the inner spline portion 70b, the nozzle body head 23A is inserted inner than the small-diameter surface 70c without being fitted into the tooth portions 70e and groove portions 70f of the inner spline portion 70b. Thus, in the present embodiment, unlike the aforementioned first embodiment, it is not required for the operator to perform positioning in the circumferential direction in order to engage the nozzle body head 23A with the inner spline portion 70b. Therefore, it is easier to insert the nozzle body head 23A into the inner spline portion 70b.

After this, the following is also similar to the case of the aforementioned first embodiment: that the nozzle body head 23A is arranged at the application start position of the grease and that the operator closes the operation lever 4 until the operation lever 4 is in the fully closed state.

In this operation, in the case of the present embodiment, the nozzle body head 23A moves back toward the hole portion 70a and, at the same time, rotates in the second rotation direction R2, as shown in FIG. 22. As a result, the grease G in the front recess portion 23j and in each nozzle 83n is discharged from each nozzle opening portion 83h (not shown in the figure). The grease G is discharged along the inclination directions of the nozzles 83n.

Namely, as advancing from the interior of the nozzle body head 23A to the outer circumferential portion and also to the front end of the nozzle body head 23A, the grease G is discharged in an oblique direction that is inclined in the first rotation direction R1, which is opposite to the second rotation direction R2.

The first groove surface 83e, in the groove portion 83d, which is circumferentially adjacent to the second groove surface 83f where the nozzle opening portion 83h is opened, is inclined at an angle of δ with respect to the second groove surface 83f. Furthermore, because the groove portion 83d is formed in the chamfer portion 83c, the first groove surface 83e is narrower toward the front end surface 83i. As a result, the grease which has been discharged from the nozzle opening portion 83h, passes through the interior of the same groove portion 83d, moves beyond the first groove surface 83e on the first rotation direction R1 side and beyond the chamfer portion 83c adjacent to this first groove surface 83e to be discharged toward the inner spline portion 70b.

Therefore, the grease G is unlikely to be left in the groove portion 83d and on the chamfer portion 83c.

As a result, the grease G is applied by a given amount along a spiral trail that obliquely transverses on the tooth portions 70e and groove portions 70f of the inner spline portion 70b.

The grease G that transverses on the groove portions 70f of the inner spline portion 70b is at least partially pushed into the groove portions 70f in accordance with an amount of discharging pressure.

After completion of the application of the grease the operator pulls out the holder body 2 from the workpiece 70. At this time, with the front end of the nozzle body head 23A, the grease G is in contact via the second groove surfaces 83f that are formed in an inclined manner. Therefore, at the time of pulling out, the grease G is likely to be cut off along the second groove surfaces 83f. Furthermore, similarly to the aforementioned first embodiment, at the time of pulling out, the nozzle body head 23A is not rubbed with the applied grease G. Therefore, deformation of the grease G after application is prevented.

Thus, according to the grease application device of the present embodiment, at the time of pulling out the nozzle body 20A, splattering or deformation of the grease G is not produced. This eliminates the necessity of wiping off grease from the inner spline portion 70b or the nozzle. Therefore, a swift grease application is made available.

Next, workings of application mode of the grease G according to the present embodiment will be described.

Figure 23:
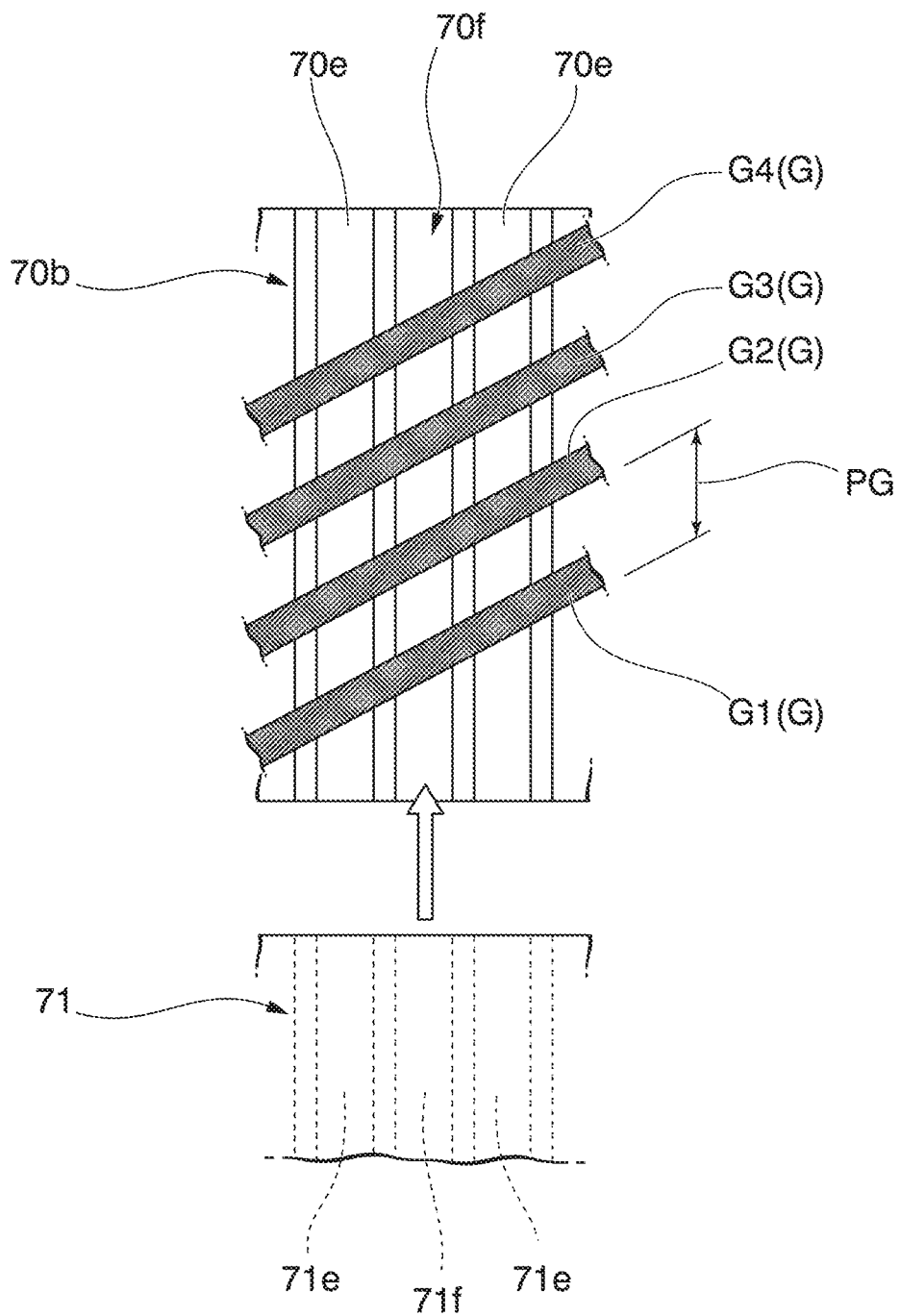
FIG. 23 is a schematic diagram for explaining workings of grease application by the grease application device according to the second embodiment of the present invention.

FIG. 23 is a schematic diagram for explaining workings of grease application by the grease application device according to the second embodiment of the present invention.

As shown in FIG. 23, in the present embodiment, the grease G is applied in a spiral manner so as to diagonally cross the extending direction of the tooth portions 70e and groove portions 70f of the inner spline portion 70b. Therefore, in the longitudinal direction of specific tooth portion 70e and groove portion 70f, a plurality of rows of grease for example, greases G1, G2, G3, G4 and the like are applied at regular pitches GP.

Suppose that an insertion part 71, which has a spline on its outer circumference, is assembled onto the workpiece 70, the spline having groove portions 71e and tooth portions 71f that are to be respectively fitted onto the tooth portions 70e and groove portions 70f of the inner spline portion 70b. At this time, when the insertion part 71 is being inserted into the workpiece 70 in the direction as shown by the arrow in the figure, for example the grease G1 is spread in a fitting gap from the insertion part 71 while the insertion part 71 is advancing a distance GP.

Furthermore, when the insertion of the insertion part 71 is continued, the greases G2, G3, G4 are sequentially spread each by the unit of distance GP in the fitting gap.

Therefore, with the insertion of the insertion part 71, the grease G is filled between the tooth portions 70e and the groove portions 71e, and between the groove portions 70f and the tooth portions 71f, respectively in a substantially uniform manner.

In the case of the aforementioned first embodiment, a given amount of grease G is applied onto the inner spline portion 70b similarly to the present embodiment, but the grease G is applied linearly to the interiors of the groove portions 70f. In this case, when an amount of movement of the grease G in the circumferential direction decreases due to, for example, irregularity in fitting gap from the insertion part 71 or other causes, then there is a possibility that the distribution of the grease G is varied among the workpieces even if an application amount of the grease G is fixed.

However, according to the application mode of the present embodiment, the grease G is applied so as to extend around in the circumferential direction. Therefore, it is possible to reduce the variation in distribution of the grease G among workpieces after the assembly of the workpieces.

As has been described above, according to the grease application device of the present embodiment and to the grease application method of the present embodiment by use of the grease application device, it is possible to easily and securely apply a given amount of grease in the grooves of the inner spline portion, similarly to the aforementioned first embodiment.

Note that in the description of the aforementioned first embodiment, the nozzle body 20 is supported so as to be movable with respect to the holder body 2 as a support body. In the description of the aforementioned first embodiment, by being held by the operator at the time of grease discharge from the nozzles 23n, the holder body 2 is not moved even if the operation lever 4 is operated, and the operation of moving the nozzle body 20 in a direction opposite to the insertion direction is performed.

However, so long as the nozzle body is insertable into a workpiece, the nozzle body may be fixed to a support body that is not movable by the operator. For example, the nozzle body may be supported by a support body, such as a support mount, that has a movable arm capable of moving with respect to the workpiece, and the position of the movable arm may be fixed after the first end portion of the nozzle body is inserted into the workpiece by the movable arm. In this case, in a state with the position of the movable arm being fixed, the operator operates on the operation portion, to thereby make it possible to operate the nozzle body shift portion and the grease pressure-feed portion.

In the description of the aforementioned first embodiment, description has been for the case where the operation portion is the operation lever 4 that performs a rotation movement by the operation, by way of example. However, so long as two operation states are switchable that correspond to the position of the nozzle body and to the discharge state of the grease, the operation portion is not limited to the operation lever 4. For example, the operation portion may be a sliding knob, a rotation handle, an operation button, or the like.

In the description of the aforementioned first embodiment, description has been for the case where the nozzle body shift portion is a power transmission mechanism that uses a hydraulic pressure, by way of example. However, the nozzle body shift portion may be another mechanical power transmission mechanism such as, for example, a link, a cam, or a gear transmission mechanism. The nozzle body shift mechanism may be a power transmission mechanism that uses an electromotive drive source such as a motor.

In the description of the aforementioned first embodiment, description has been for the case where the outer circumferential surfaces 22b of the guide portion 22 are provided coaxially with the central axis line O of the nozzle body head 23, by way of example. However, as for the shape and arrangement of the guide portion 22, appropriate shape and arrangement may be adopted based on the shape of the hole portion on the proximal side and based on a positional relationship between this hole portion and the inner spline portion.

In the description of the aforementioned first embodiment, description has been for the case where the operator switches the states of the operation lever 4 between the fully open state and the fully closed state to apply grease, by way of example. However, an application amount of grease can be modified by an operation amount of the operation lever 4. The operator may, for example, open the operation lever 4 to a middle position between the fully open state and the fully closed state, and then, close the operation lever 4 to the fully closed state, to thereby apply a less amount of grease G.

For example, the operator may open the operation lever 4 to the fully open state, and then, close the operation lever 4 to a middle position between the fully open state and the fully closed state, to thereby apply a less amount of grease G.

In these cases, with an open amount or closed amount of the operation lever 4 being made fixed, it is possible to apply a given amount of grease G that is less than that of the aforementioned embodiment.

In the description of the aforementioned second embodiment, description has been for the case where the operator inserts the grease gun 1A into the workpiece inner spline portion 70b, and performs a grease application, by way of example. However, as described above, the nozzle body head 23A of the grease gun 1A is easily inserted into an internal side of the inner spline portion 70b without being fitted into the groove portions 70f of the inner spline portion 70b. The nozzle body head 23A is insertable into the inner spline portion 70b without making a circumferential positional adjustment with respect to the inner spline portion 70b.

This insertion operation of the nozzle body head 23A is easier than an operation including the circumferential positioning between the nozzle body and the inner spline portion, even if the insertion operation is an operation by a robot. Therefore, the nozzle body head 23A may be inserted into the inner spline portion 70b by a robot.

All the constituent elements described above may be appropriately combined, deleted, and replaced within the technical spirit of the present invention in order to achieve the present invention.

INDUSTRIAL APPLICABILITY

According to the aforementioned embodiments (including modifications), it is possible to provide a grease application device and a grease application method that are capable of easily and securely applying a given amount of grease into grooves of an inner spline portion.

BRIEF DESCRIPTION OF THE REFERENCE SYMBOLS 1, 1A: grease gun
2: holder body (support body)
4: operation lever (operation portion)
5: first check valve
6: piston (grease pressure-feed portion)
7: grease retention portion
7a: cylinder (measurement chamber)
8: second check valve
10, 10A: nozzle body shift portion
11: first cylinder
13: bare area prevention sensor
16, 16A: second cylinder
20, 20A: nozzle body
22: guide portion
22a: guide rib
23, 23A: nozzle body head
23b: spline
23g: inclined surface
23h, 83h: nozzle opening portion
23n, 83n: nozzle
24: grease injection portion
25: abutment plate
26b, 86b: grease flow passage
29: collar
50: mount
50a: base plate 51: first support portion
52: second support portion
54: second shutoff valve (mount-time shutoff valve)
54c: mount state detection switch
57: grease supply tube
58: hook (hanger member)
70: workpiece
70a: hole portion
70b: inner spline portion
70f: groove portion (groove of inner spline portion)
100: grease application device
200: work transfer device
201: display portion
C, H, O: central axis line
G, G1, G2, G3, G4: grease
83b: circular pillar portion
83c: chamfer portion
83d: groove portion
83e: first groove surface
83f: second groove surface (groove surface inclined in second rotation direction)
R1: first rotation direction
R2: second rotation direction

The invention claimed is:

1. A grease application device, comprising:
a nozzle body that has a first end portion insertable into an inner spline portion, the inner spline portion being formed at an end portion of a workpiece;
a nozzle that is formed on the first end portion of the nozzle body and discharges grease into a groove of the inner spline portion;
a nozzle body shift portion that is connected to a second end portion of the nozzle body and that moves the nozzle body in a longitudinal direction, the second end portion being on an opposite side to the first end portion;
a grease retention portion that retains the grease discharged from the nozzle;
a grease pressure-feed portion that pressure-feeds the grease retained in the grease retention portion to the nozzle; and
an operation portion that links an operation of causing the nozzle body shift portion to move the nozzle body from the first end portion toward the second end portion with an operation of causing the grease pressure-feed portion to discharge the grease from the nozzle.

2. The grease application device according to claim 1,
wherein an outline of the first end portion of the nozzle body is a spline shape that is fitted into the inner spline portion, and
wherein in an interior of the nozzle body,
a grease flow passage is formed that is connected to the grease retention portion and the nozzle, and that allows the grease, which is pressure-fed from the grease retention portion, to flow into the nozzle.

3. The grease application device according to claim 2,
wherein in a middle portion in the longitudinal direction, the nozzle body comprises a guide rib that is attached so as to be movable in the longitudinal direction with respect to a hole portion formed in the end portion of the workpiece or to an inner circumferential surface of a collar insertable into the hole portion.

4. The grease application device according to claim 1,
wherein on an outer circumferential portion of the first end portion of the nozzle body, an inclined surface is formed that is inclined from an outer circumferential side toward a center in a direction from the second end portion toward the first end portion, and
wherein in the direction from the second end portion toward the first end portion, the nozzle is inclined from an interior of the nozzle body toward an outer circumferential side and is opened in the inclined surface.

5. The grease application device according to claim 1,
wherein in the first end portion of the nozzle body, there are formed:
a circular pillar portion that is inserted inner than an innermost circumferential portion of the inner spline portion;
a chamfer portion that is formed in an outer circumferential portion of a front end of the circular pillar portion; and
a plurality of groove portions with a V-shaped cross-section that are formed across the chamfer portion so as to be inclined in a first rotation direction about a central axis line of the nozzle body from a center side of the first end portion toward an outer circumference side when seen from an axis direction of the first end portion,
wherein in an interior of the nozzle body,
a grease flow passage is formed that is connected to the grease retention portion and the nozzles, and that allows the grease, which is pressure-fed from the grease retention portion, to flow into the nozzles,
wherein the nozzles extend in oblique directions that are inclined in the first rotation direction from an interior of the first end portion toward an outer circumferential portion and also toward a front end of the first end portion, and additionally open in groove surfaces of the groove portions, the groove surfaces being inclined in a second rotation direction opposite to the first rotation direction, and
wherein when moving the nozzle body from the first end portion toward the second end portion in the longitudinal direction, the nozzle body shift portion rotates the nozzle body in the second rotation direction.

6. The grease application device according to claim 1,
wherein the grease retention portion comprises a measurement chamber that retains a given amount of the grease, and
wherein through an operation on the operation portion, the grease pressure-feed portion discharges the grease from the nozzle within a range of the given amount that is retained in the measurement chamber.

7. The grease application device according to claim 1,
wherein the nozzle body shift portion, the grease retention portion, the grease pressure-feed portion, and the operation portion are provided in a holder body that is movably held by an operator, and
wherein the nozzle body is moved in the longitudinal direction by the nozzle body shift portion that is fixed to the holder body.

8. The grease application device according to claim 7, comprising:
a grease supply tube with flexibility that is connected to the grease retention portion in order to supply grease to the grease retention portion; and
a hanger member on which the grease supply tube is hung.

9. The grease application device according to claim 7, comprising:
a mount on which the holder body and the nozzle body are mounted; and
a mount-time shutoff valve that is arranged on the mount and that, in a linked manner with a mount state and a mount-release state of the holder body and the nozzle body on the mount, shuts off a flow passage of the grease supplied to the grease retention portion in the mount state and opens the flow passage of the grease supplied to the grease retention portion in the mount-release state.

10. The grease application device according to claim 1, comprising
a bare area prevention sensor that counts a number of operations on the operation portion or a number of movements of the nozzle body shift portion to detect a number of executions of grease applications.

11. A grease application method, comprising the steps of:
taking up the grease application device according to any one of claims 1 to 10;
operating the operation portion of the grease application device to cause the grease retention portion to retain the grease;
inserting the first end portion of the nozzle body into an inner spline portion that is formed at an end portion of a workpiece;
operating the operation portion to move the nozzle body to the second end portion side and also to cause the grease pressure-feed portion to discharge the grease from the nozzle, to thereby apply the grease to the inner spline portion; and
pulling out the nozzle body from the workpiece.

* * * * *